(12) United States Patent
Matsuo et al.

(10) Patent No.: US 8,577,373 B2
(45) Date of Patent: Nov. 5, 2013

(54) HANDOVER DESTINATION SPECIFICATION SYSTEM, MOBILE TERMINAL, AND BASE STATION

(75) Inventors: Hidenori Matsuo, Kanagawa (JP); Takahisa Aoyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 49 days.

(21) Appl. No.: 13/201,928

(22) PCT Filed: Mar. 17, 2010

(86) PCT No.: PCT/JP2010/001922
§ 371 (c)(1),
(2), (4) Date: Aug. 17, 2011

(87) PCT Pub. No.: WO2010/113407
PCT Pub. Date: Oct. 7, 2010

(65) Prior Publication Data
US 2011/0300868 A1 Dec. 8, 2011

(30) Foreign Application Priority Data
Mar. 31, 2009 (JP) .................................. 2009-084470

(51) Int. Cl.
*H04W 36/00* (2009.01)

(52) U.S. Cl.
USPC .......................... 455/436; 455/435.1; 455/438

(58) Field of Classification Search
USPC ............ 370/328, 329, 331, 335, 338; 455/73, 455/411, 435.1, 436, 438, 432.1, 439, 442, 455/443, 444, 452.2
See application file for complete search history.

(56) References Cited

U.S. PATENT DOCUMENTS

| | | | |
|---|---|---|---|
| 2008/0159235 A1* | 7/2008 | Son et al. ...................... | 370/332 |
| 2009/0047960 A1* | 2/2009 | Gunnarsson et al. ......... | 455/436 |
| 2009/0239533 A1* | 9/2009 | Somasundaram et al. .... | 455/434 |
| 2012/0021725 A1* | 1/2012 | Rune ............................ | 455/411 |

OTHER PUBLICATIONS

International Search Report dated Apr. 6, 2010.
3GPP TSG-RAN WG2 Meeting #63, "Way forward for handover to HeNB," Telecom Italia, et al., R2-084736, Aug. 18-22, 2008, pp. 1-2.
3GPP TSG-RAN WG2 #61, "Mechanism for UE measurements and reporting of global cell identity," Ericsson, R2-081046, Feb. 11-15, 2008, pp. 1-3.
3GPP TSG RAN WG2 #62, "UE access control in CSG cell," Panasonic, R2-082238, May 5-9, 2008, pp. 1-5.

* cited by examiner (Continued)

*Primary Examiner* — Wesley Kim
*Assistant Examiner* — Dinh P Nguyen
(74) *Attorney, Agent, or Firm* — Dickinson Wright PLLC

(57) ABSTRACT

A technology is disclosed that provides a handover destination specification system and the like capable of reducing signaling load and shortening handover processing time. According to the technology, the handover destination specification system is configured by: a mobile terminal that measures a reception quality of each cell indicating an accessible range formed by a plurality of base stations capable of being connection targets of the mobile terminal, and when the measured reception quality satisfies a predetermined condition, transmits to a connection base station, a first message including identification information of the cell that satisfies the predetermined condition and information on the reception quality of the cell; and the connection base station that transmits to the mobile terminal, a second message including information for detecting unique global identification information of the cell of which the reception quality has been measured, based on the first message. The mobile terminal detects the global identification information of the cell of which the reception quality has been measured based on the second message, checks access permission for the detected cell, and when access permission is confirmed, transmits to the connection base station, a third message including the global identification information of the cell for which access permission is granted.

4 Claims, 21 Drawing Sheets

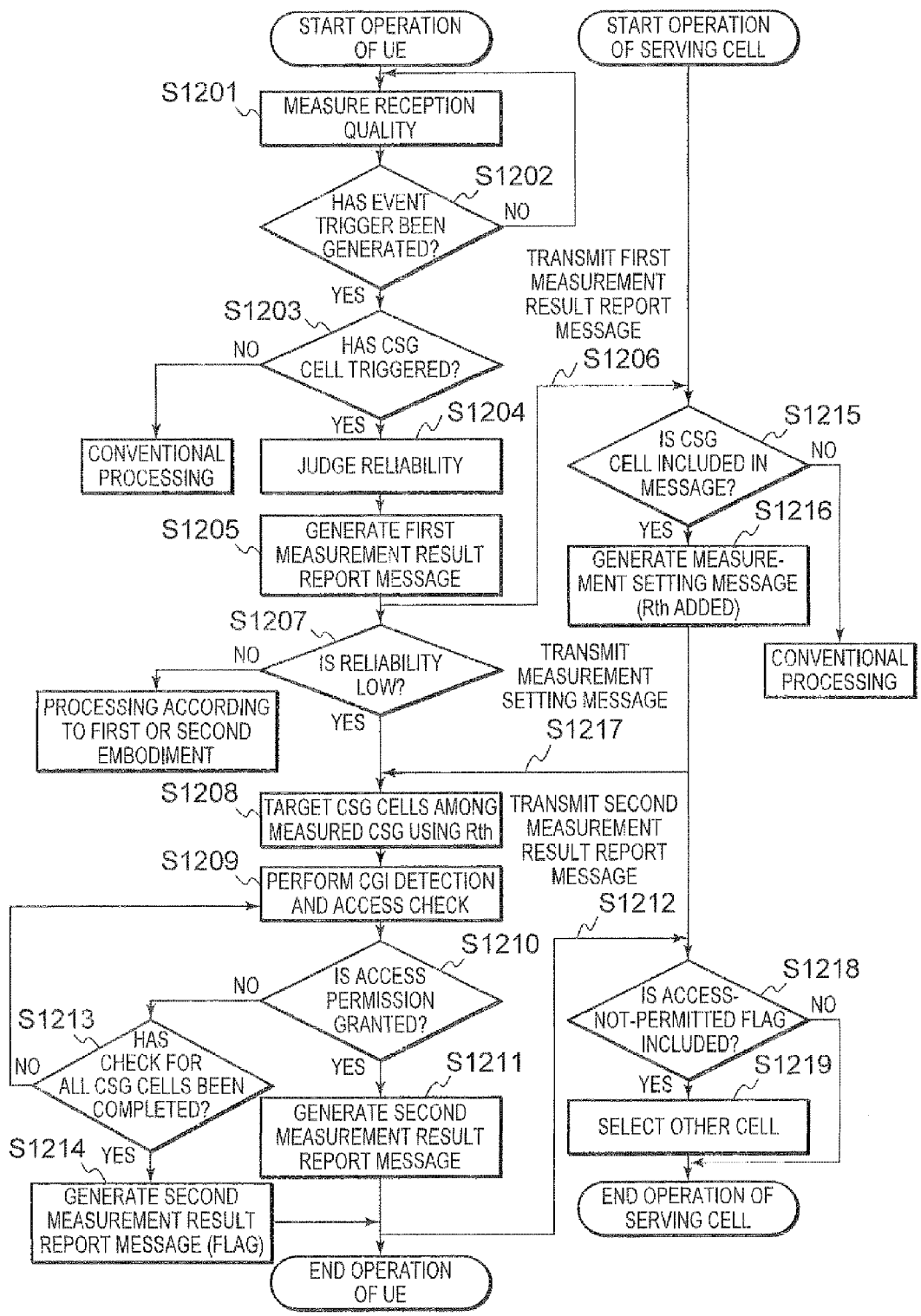

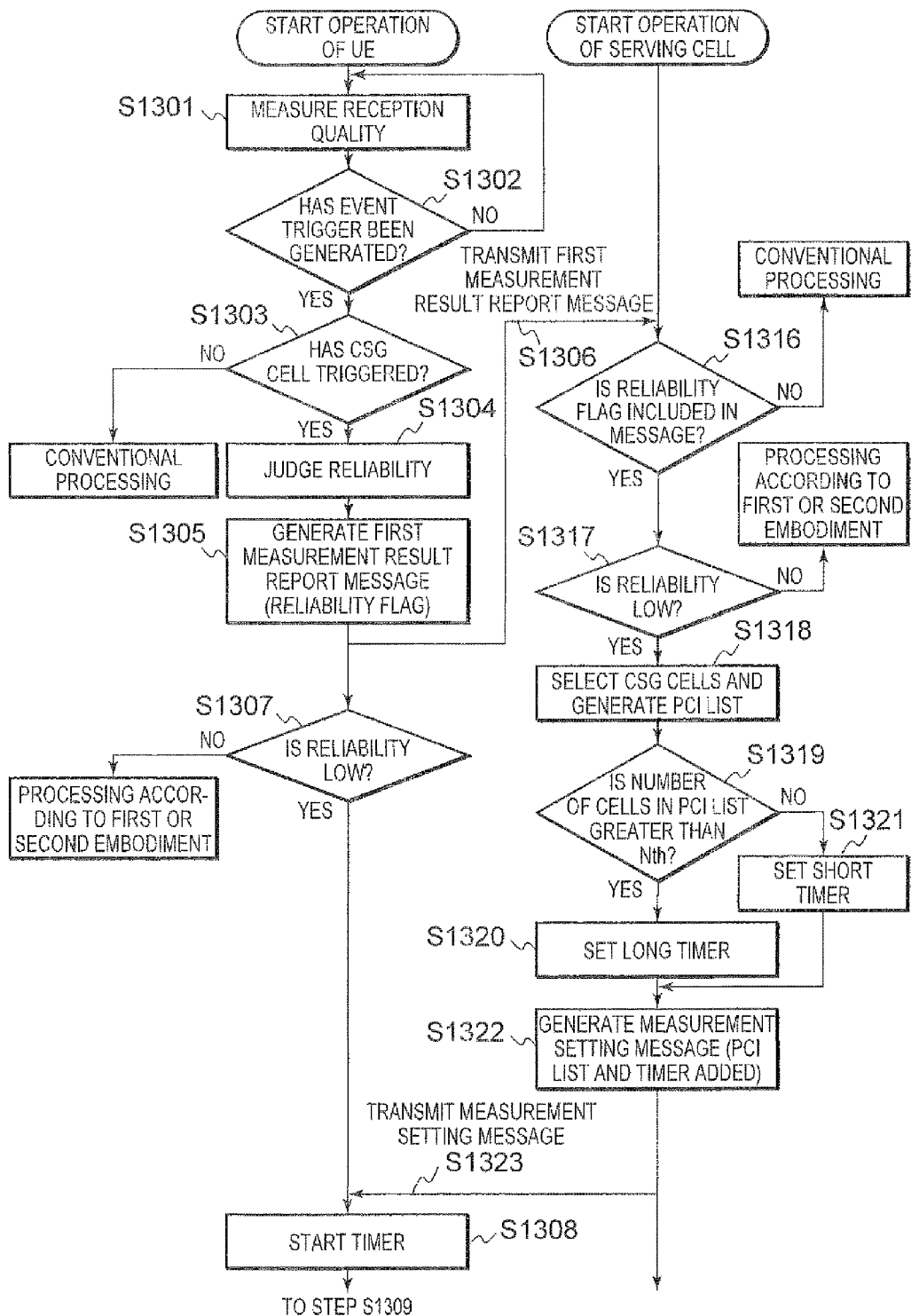

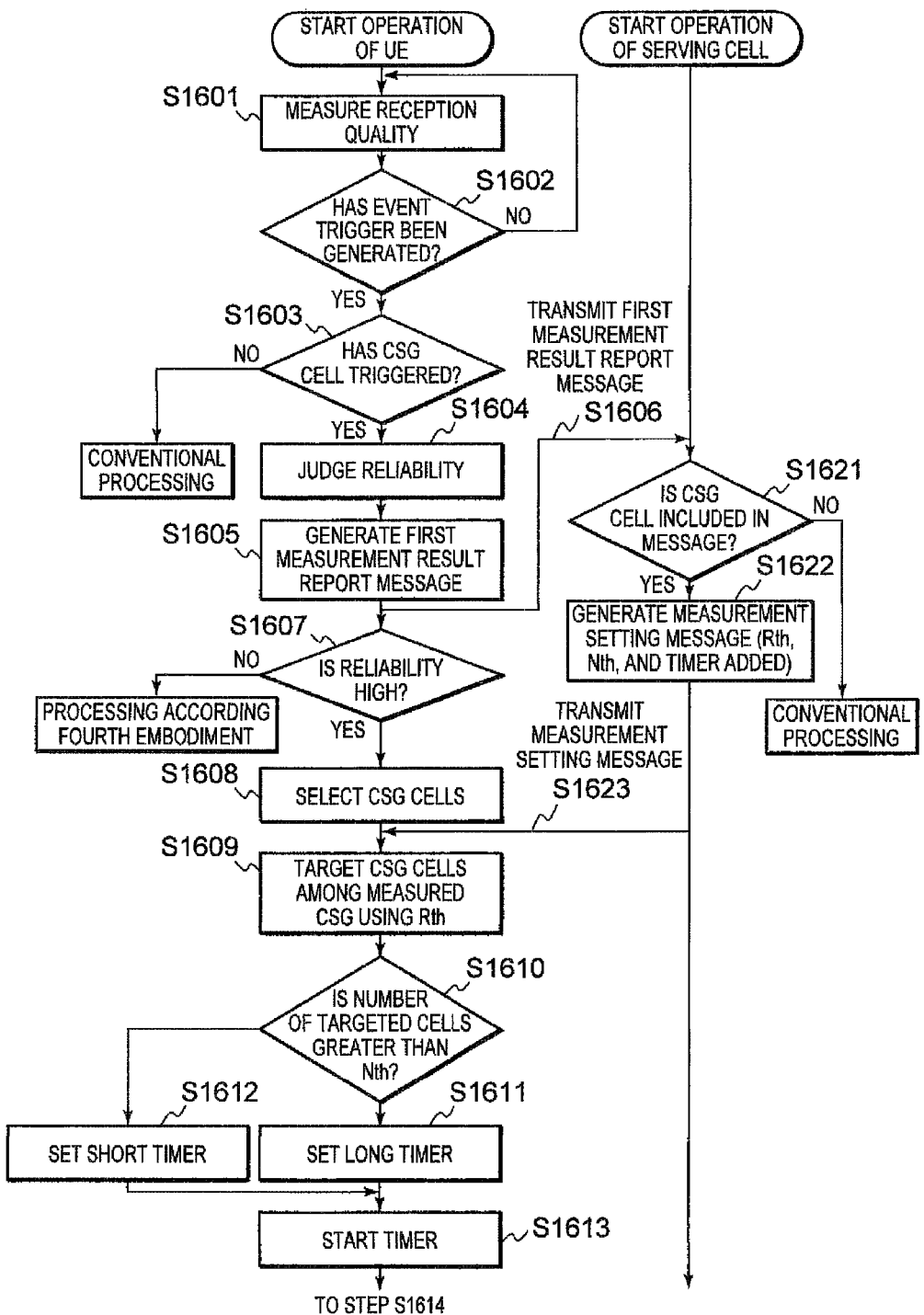

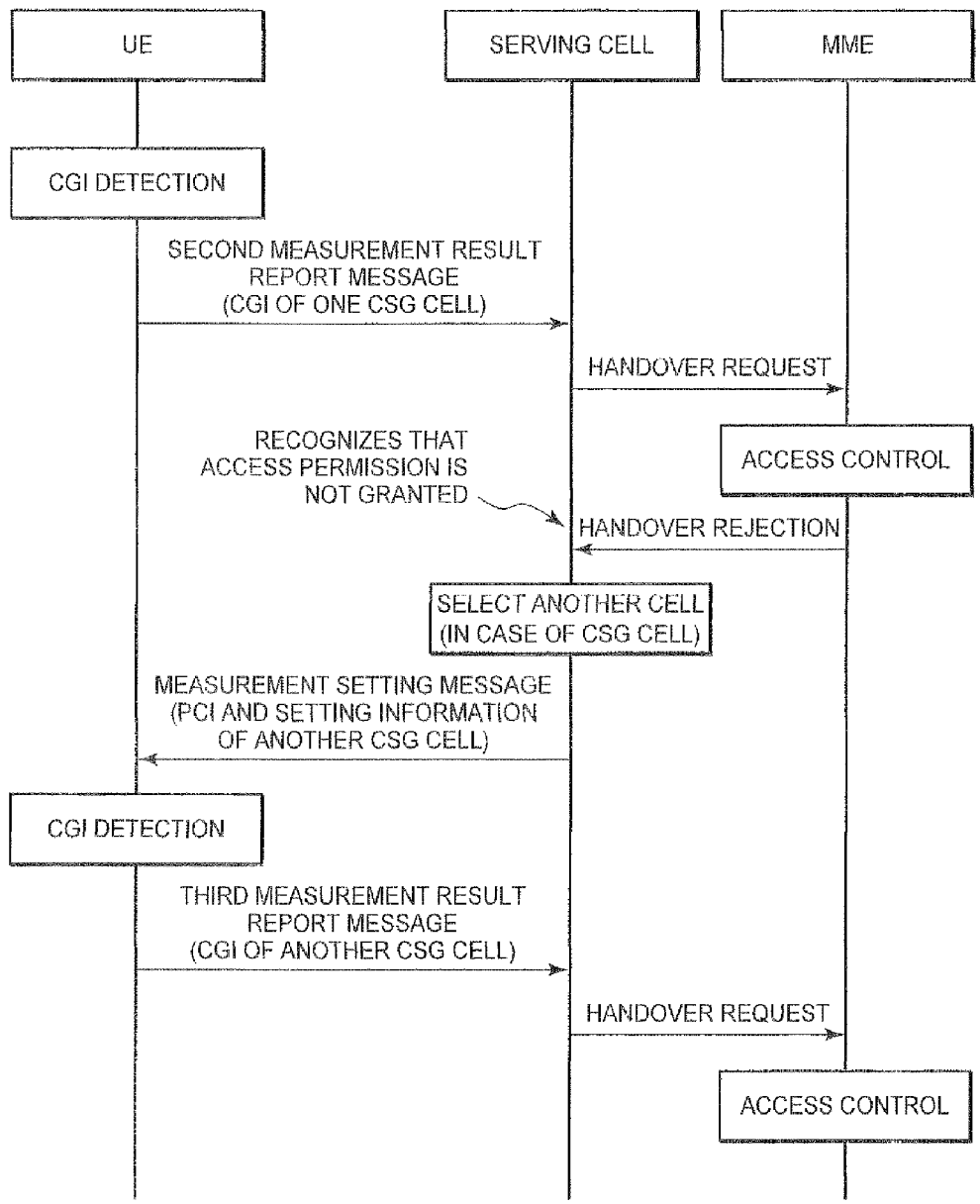

US 8,577,373 B2

HANDOVER DESTINATION SPECIFICATION SYSTEM, MOBILE TERMINAL, AND BASE STATION

TECHNICAL FIELD

The present invention relates to a handover destination specification system, a mobile terminal, and a base station, in which the handover destination specification system performs a process for specifying a handover destination of a mobile terminal.

BACKGROUND ART

In 3GPP, setting up a home base station (Home eNB; referred to, herein after as "HeNB") for indoor use and constructing a closed subscriber group (CSG) cell is being discussed. As shown in FIG. 17, the CSG cell is constructed within a cell (macro-cell) constructed by ordinary base stations (eNB). Unlike the eNB, the HeNB is provided with a function enabling restriction of terminals (user equipment; referred to, hereinafter, as "UE") that are permitted access, and a UE can only connect to a HeNB for which access permission is granted. Excluding emergencies, the UE is unable to connect without access permission regardless of a HeNB with high reception quality being detected.

To check access permission for a HeNB, the UE is required to check cell identification information included in notification information transmitted from the HeNB. Each CSG cell has an ID, referred to as a CSG ID, in group units, and access permission is granted to the UE in CSG ID units. The UE collates a CSG ID list (access permission list: white list) of accessible CSG cells, notification of which has been received from a network, and the CSG ID that is the cell identification information received from the notification information of the CSG cell, and judges that access is possible if the CSG ID of the detected CSG cell is included in the white list.

The HeNB connects to a gateway referred to as a HeNB gateway (written as "HeNB GW" in FIG. 17), or a mobility management device (mobility management entity; referred to, hereinafter, as "MME"). The MME secures network resources and manages NAS messages, such as a position registration message. Because the pieces of information in the white list are information on individual terminals, in view of security, the HeNB, assumed to be owned by each household, does not have the information in the white list. On the other hand, the MME can have the white list because it is managed by an operator.

All cells have cell identification information referred to as a physical cell ID (PCI). Regarding the CSG cell, as shown in FIG. 18, CSG cells having the same PCI may be present near a serving cell to which the UE is currently connected. This is referred to as a PCI collision. The UE measures reception quality for signals from near-by cells, and a trigger is generated when the reception quality of a near-by cell satisfies certain conditions. This is referred to as an event trigger. When the trigger is generated, the UE notifies the serving cell of the PCI of the cell having high reception quality using a measurement result report message (measurement report).

Based on the reception quality information, the serving cell decides a handover destination, and transmits a handover request message (handover request; HO request) to the handover destination cell. In this instance, if a PCI collision occurs, the serving cell may transmit the handover request message to the wrong cell. This is referred to as PCI confusion.

To prevent PCI confusion, the UE detects a cell global ID (CGI) that is a unique cell identifier from a notification message of the CSG cell, and notifies the serving cell of the CGI using the measurement result report message. As a result, the serving cell specifies the CSG cell. However, because time is required for CGI detection, first, notification is given of the PCI of the cell having high reception quality and the measured reception quality by a first measurement result report message (1st measurement report). The serving cell selects one handover destination candidate cell from the CSG cells within the received first measurement result report message and, to instruct the UE to detect the CGI of the CSG cell, transmits a measurement setting message (measurement configuration) including the PCI of the CSG cell and setting information required for detecting the CGI to the UE.

The UE performs CGI detection of the CSG cell of which instruction has been given based on the measurement setting message, and notifies the serving cell of the detected CGI by a second measurement result report message (2nd measurement report). A sequence of the above-described operation is shown in FIG. 19.

CITATION LIST

Non-Patent Document

Non-patent Document 1: "Way forward for handover to HeNB", 3GPP TSG-RAN WG2 meeting #63 Notes R2-084736

Because the serving cell does not have the white list, the UE does not know whether or not access permission is granted for the CSG cell of which notification has been given through the first and second measurement result report messages, until issuing an inquiry to the MME (or the HeNB gateway). If access permission is not granted for the CSG cell of which notification has been given through the second measurement result report message, a measurement setting message and a (third) measurement result report message are required again. As a result, handover processing time increases. A sequence where the above-described issue occurs is shown in FIG. 20.

SUMMARY OF INVENTION

In light of the above-described issues, an object of the present invention is to provide a handover destination specification system, a mobile terminal, and a base station capable of reducing signaling load and shortening handover processing time.

To achieve the above-described object, the present invention provides a handover destination specification system that performs a process for specifying a handover destination of a mobile terminal, the handover destination specification system including: the mobile terminal that measures a reception quality of each cell indicating an accessible range formed by a plurality of base stations capable of being connection targets of the mobile terminal, and when the measured reception quality satisfies a predetermined condition, generates a first message including identification information of the cell that satisfies the predetermined condition and information on the reception quality of the cell, and transmits the first message to a connection base station to which the mobile terminal is currently connected; and the connection base station that generates a second message including information for detecting unique global identification information of the cell of which the reception quality has been measured, based on the first message, and transmits the second message to the mobile terminal. The mobile terminal detects the global identification information of the cell of which the reception quality has been measured based on the second message, checks access permission for the detected cell, and when access permission is confirmed, generates a third message including the global identification information of the cell for which access permission is granted, and transmits the third message to the connection base station. As a result of the configuration, signaling load can be reduced and handover processing time can be shortened. Here, the mobile terminal refers to, for example, a terminal in cellular communication such as that described hereafter. Reception quality refers to, for example, the amount of received power.

According to the present invention, a mobile terminal in a handover destination specification system that performs a process for specifying a handover destination of the mobile terminal is provided, the mobile terminal including: a measuring means for measuring reception quality of each cell indicating an accessible area formed by a plurality of base stations capable of being a connection target of the mobile terminal; a judging means for judging whether or not the measured reception quality satisfies a predetermined condition; a generating means for generating, when judged that the predetermined condition is satisfied, a first message including identification information of the cell satisfying the predetermined condition and information on the reception quality of the cell; a transmitting means for transmitting the generated first message to a connection base station to which the mobile terminal itself is currently connected; a receiving means for receiving from the connection base station, a second message including information for detecting unique global identification information of the cell of which the reception quality has been measured, based on the first message; and a processing means for detecting the global identification information of the cell of which reception quality has been measured, based on the received second message, and checking access permission for the detected cell. The generating means, when access permission is confirmed, generates a third message including the global identification information of the cell for which access permission is granted. The transmitting means transmits the generated third message to the connection base station. As a result of the configuration, signaling load can be reduced and handover processing time can be shortened.

According to the present invention, a base station to which a mobile terminal is currently connected in a handover destination specification system that performs a process for specifying a handover destination of the mobile terminal is provided, the base station including: a receiving means for receiving from the mobile terminal, when reception quality of each cell indicating an accessible range formed by a plurality of base stations capable of being a connection target of the mobile terminal satisfies a predetermined condition, a first message including identification information of the cell satisfying the predetermined condition and information on the reception quality of the cell; a generating means for generating a second message including information for detecting unique global identification information of the cell of which reception quality has been measured based on the first message; and a transmitting means for transmitting the generated second message to the mobile terminal. As a result of the configuration, signaling load can be reduced and handover processing time can be shortened.

The handover destination specification system, the mobile terminal, and the base station of the present invention are configured as described above, and signaling load can be reduced and handover processing time can be shortened.

BRIEF DESCRIPTION OF DRAWINGS

FIG. 12 is a flowchart of an example of an operation flow according to the fourth embodiment;

FIG. 13A is a flowchart of part of an example of an operation flow according to a fifth embodiment of the present invention;

FIG. 16A is a flowchart of part of an example of another operation flow according to the fifth embodiment of the present invention;

FIG. 20 is a sequence chart for explaining a conventional issue.

DESCRIPTION OF EMBODIMENTS

First Embodiment

A first embodiment of the present invention will be described. The point according to the first embodiment is to perform CGI detection by targeting CSG cells for which the possibility of access permission being granted is high, using cell information (fingerprint) that had been detected in the past and is held by the UE. Specifically, a CSG cell for which access permission had been granted in the past, or in other word, a CSG cell for which the possibility of access permission still currently being granted is high, and has high reception quality regarding near-by CSG cells measured by the UE for first measurement result report message transmission is selected from past cell information held by the UE.

Here, as an example, the cell information detected by the UE in the past is assumed to include a list of PCI of CSG cells that were accessible among cells detected by the UE in the past. The cell information may include CSG ID and CGI that are pieces of identification information of the CSG cell, in addition to the PCI, or may hold the PCI, the CSG ID, and the CGI of CSG cells to which access was not permitted in the past. Based on reception of the first measurement result report message (Step S101), a serving cell inserts only setting information required for measurement in a measurement setting message, without including the cell ID (PCI) of the CSG cell for which CGI detection is to be performed that is included in a conventional message, and transmits the measurement setting message to the UE (Step 102).

Figure 1:
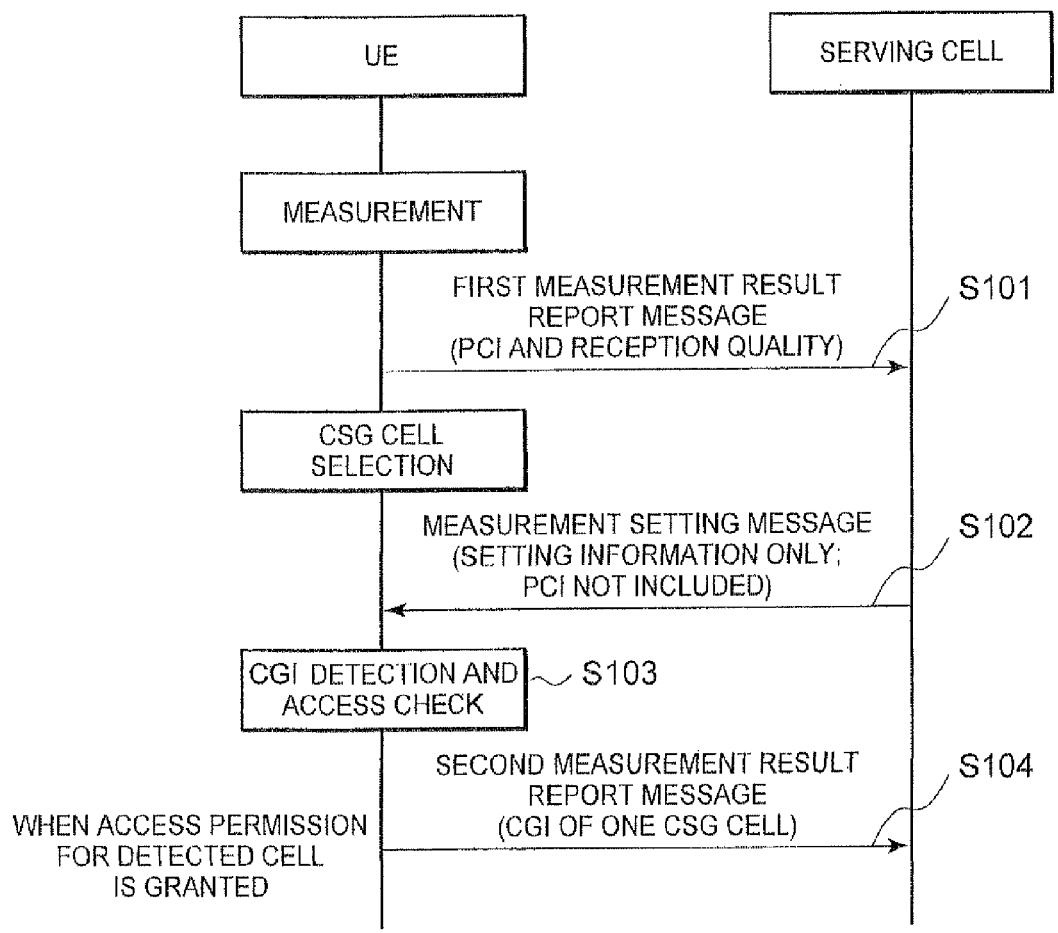
FIG. 1 is a sequence chart of an example of a processing sequence for a measurement result report message according to a first embodiment of the present invention.

The UE that has received the measurement setting message performs CGI detection and access check starting from the CSG cell with high reception quality, among the CSG cells selected earlier (Step S103). When access permission for the CSG cell is confirmed, the UE immediately notifies the serving cell of the CGI of the CSG cell for which access permission is granted, using a second measurement result report message, without waiting for the CGI detection of all CSG cells (Step S104). According to the first embodiment, numerous transmissions of the measurement setting messages and the measurement result report messages for CSG cells for which access permission is not granted, as performed in conventional technology, are eliminated. Therefore, signaling load can be reduced, and handover processing time can be shortened. A sequence of the above-described operation is shown in FIG. 1.

Figure 2:
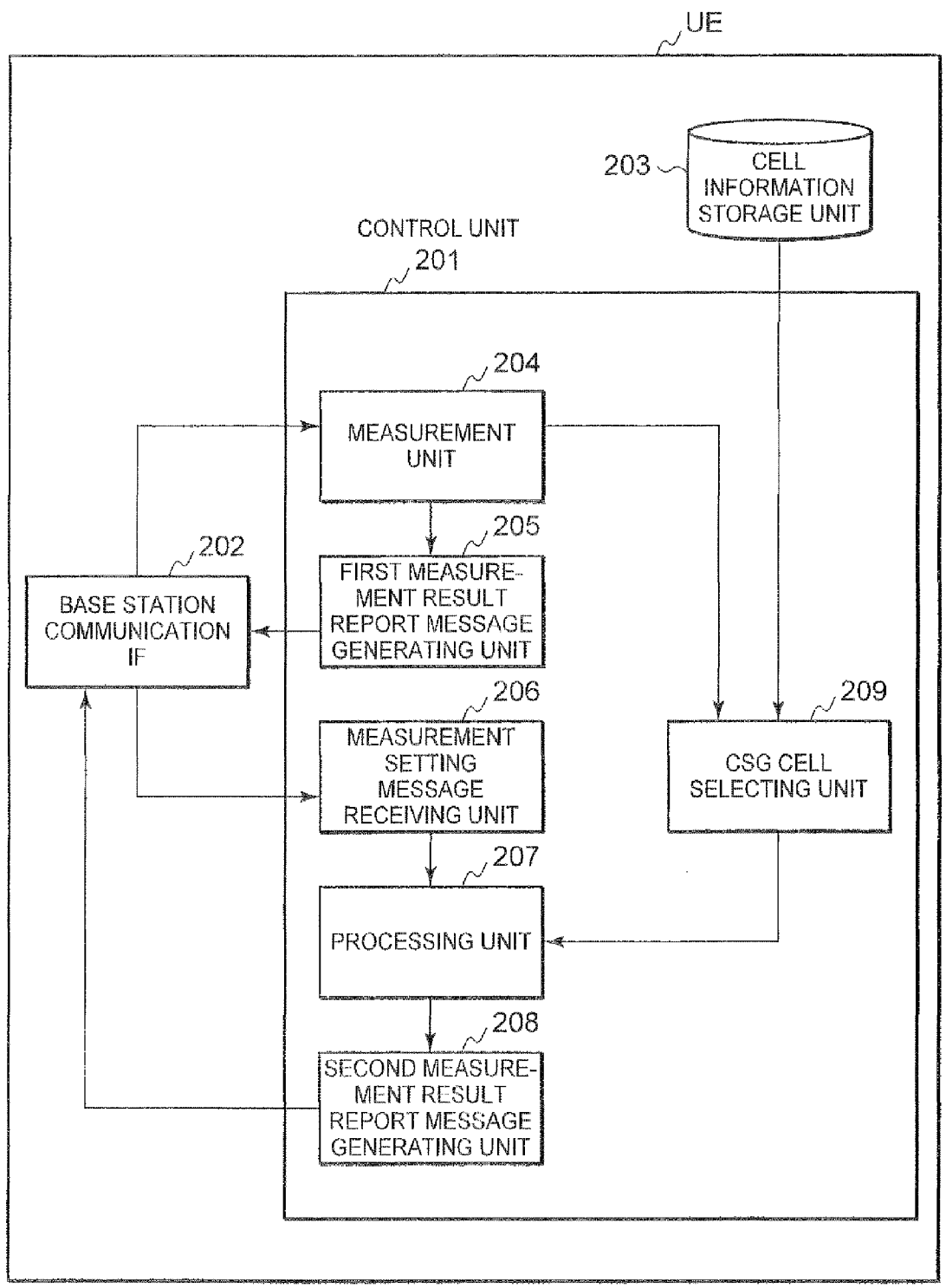
FIG. 2 is a configuration diagram of an example of a configuration of a UE according to the first embodiment of the present invention.

Here, an example of a configuration of the UE according to the first embodiment of the present invention is shown in FIG. 2. The UE is configured by a control unit 201, a base station communication IF 202, and a cell information storage unit 203. In addition, the control unit 201 is further configured by a measurement unit (event judging unit) 204, a first measurement result report message generating unit 205, a measurement setting message (measurement configuration) receiving unit 206, a processing unit (cell ID detecting and access permission checking unit) 207, a second measurement result report message generating unit 208, and a CSG cell selecting unit 209.

The measuring unit 204 measures reception quality for signals from near-by cells. The first measurement result report message generating unit 205 generates the first measurement result report message including the PCI of cells with good reception quality, based on the measured information. The measurement setting message receiving unit 206 receives the measurement setting message including setting information required for CGI detection from the serving cell. The processing unit 207 performs CGI detection and access check starting from the CSG cell with high reception quality, among the CSG cells selected earlier.

The second measurement result report message generating unit 208 generates the second measurement result report message including the CGI of the CSG cell for which access permission is granted. The CSG cell selecting unit 209 selects the CSG cell for which the possibility of access permission still currently being granted is high and has high reception quality regarding near-by CSG cells measured for first measurement result report message transmission. The base station communication IF 202 is an interface that performs transmission and reception of messages between the UE and the serving cell. The cell information storage unit 203 stores therein information on the CSG cells for which the possibility of access permission still currently being granted is high.

In this way, according to a preferred embodiment of the present invention, a cell selecting means (CSG cell selecting unit 209) for targeting the cells for which detection of global identification information (CGI) is performed, based on predetermined information, is further included, and a processing means (processing unit 207) detects the global identification information and checks access permission for a cell corresponding to the detected global identification information, among the targeted cells. As a result of the configuration, the global identification information can be efficiently detected. In addition, according to a preferred embodiment of the present invention, the above-described predetermined information is cell information on cells for which access permission had been granted in the past, held by the mobile terminal (UE). As a result of the configuration, the possibility of access permission being granted can be increased.

Figure 3:
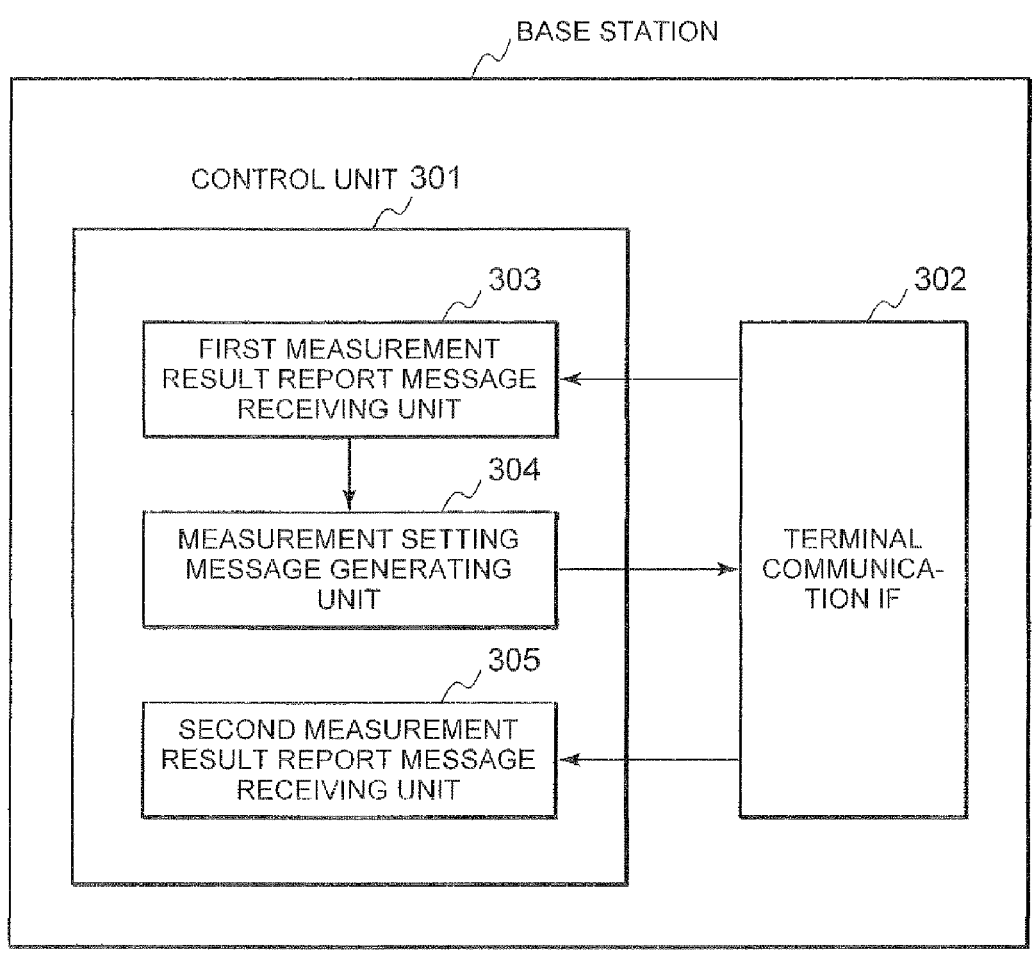
FIG. 3 is a configuration diagram of an example of a configuration of a base station (serving cell) according to the first embodiment of the present invention.

An example of a configuration of a base station (serving cell) according to the first embodiment is shown in FIG. 3. The base station is configured by a control unit 301 and a terminal communication IF 302. In addition, the control unit 301 is further configured by a first measurement result report message receiving unit (CSG cell presence judging unit) 303, a measurement setting message generating unit 304, and a second measurement result report message receiving unit 305. The first measurement result report message receiving unit 303 receives the first measurement result report message transmitted from the UE. The measurement setting message generating unit 304 generates the measurement setting message including the setting information required for CGI detection. The second measurement result report message receiving unit 305 receives the second measurement result report message. The terminal communication IF 302 is an interface that performs transmission and reception of messages between the serving cell and the UE.

Figure 4:
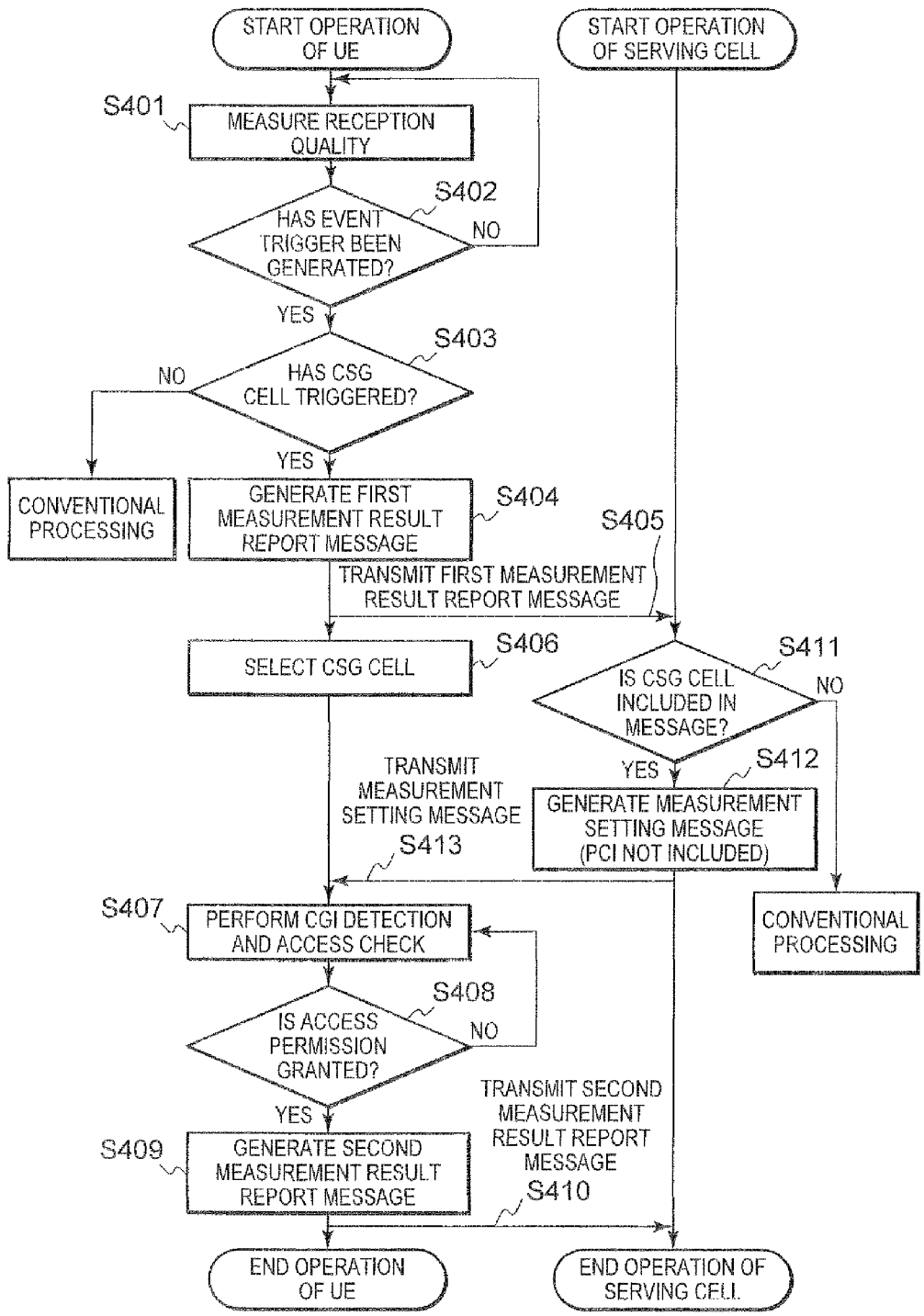
FIG. 4 is a flowchart of an example of an operation flow according to the first embodiment of the present invention.

Here, an example of a processing flow according to the first embodiment of the present invention is shown in FIG. 4. The UE measures the reception quality for signals from near-by cells (Step S401), and judges whether or not an event trigger has been generated (Step S402). When judged that the event trigger has been generated, the UE judges whether or not a CSG cell has triggered (Step S403). When judged that the CSG cell has triggered, the UE generates the first measurement result report message (Step S404). Then, the UE transmits the generated first measurement result report message to the serving cell (Step S405), and subsequently selects the CSG cells (Step S406).

Then, when the UE receives the measurement setting message (measurement configuration) from the serving cell, the UE performs CGI detection and access check starting from the CSG cell with high reception quality among the CSG cells selected earlier (Step S407). The UE judges whether or not access permission is granted (Step S408). When judged that access permission is granted, the UE generates the second measurement result report message including the CGI of the CSG cell for which access permission is granted (Step S409), and transmits the second measurement result report message to the serving cell (Step S410).

On the other hand, when the serving cell receives the first measurement result report message transmitted at Step S405, the serving cell judges whether or not a CSG cell is included in the message (Step S411). When judged that the CSG cell is included, the serving cell generates the measurement setting message (Step S412) and transmits the measurement setting message to the UE (Step S413). When judged at Step S403 that the CSG cell has not triggered or at Step S411 that the CSG cell is not included, a conventional process is performed.

Second Embodiment

According to the first embodiment, the UE performs CGI detection and access check in sequence, starting from the CSG cell with good signal reception quality among CSG cells for which the possibility of access permission being granted is high, from the cell information detected by the UE in the past. However, a cell that is to be the handover destination is required to have a certain degree of reception quality. The point according to the second embodiment is to perform CGI detection and access permission check by targeting CSG cells of which the reception quality is a threshold value $R_{th}$ or more.

Specifically, first, in a manner similar to that according to the first embodiment, the UE selects cells for which the possibility of access permission being granted is high based on cell information held by the UE. The serving cell adds the threshold value $R_{th}$ for reception quality to the measurement setting message when the first measurement result report message includes a CSG cell, and transmits the measurement setting message. The UE that has received the measurement setting message targets the cells based on reception quality using the threshold value $R_{th}$. The UE performs CGI detection and access permission check of the targeted cells, starting from the cell with high reception quality. In a manner similar to that according to the first embodiment, when access permission for a CSG cell is confirmed, the UE immediately notifies the serving cell of the CGI of the CSG cell for which access permission is granted using the second measurement result report message, without waiting for CGI detection of all CSG cells.

After checking access permission for all targeted CSG cells, when a CSG cell for which access permission is granted is not present, it is thought that reliability of the cell information is low. Therefore, CGI detection and access permission check are performed even on CSG cells for which the possibility of access permission being granted is low, if the reception quality threshold $R_{th}$ is satisfied. When access permission is not granted for any of the CSG cells, the serving cell is notified using the second measurement result report message into which information indicating that a CSG cell for which access permission is granted is not present (such as an access-not-permitted flag) is inserted. The serving cell that has received the information attempts a handover to a macro-cell or a cell having a different frequency.

Notification of the threshold value $R_{th}$ may be given from the serving cell to the UE individually using the measurement setting message or may be given as notification information. Alternatively, the UE itself may hold the threshold value $R_{th}$ in advance. According to the second embodiment, CGI detection and access check processes for CSG cells having low reception quality and to which a handover is unlikely are no longer performed, and transmission of needless measurement setting messages is eliminated. As a result of the access-not-permitted flag being introduced, the serving cell can quickly start the handover process to another cell.

Figure 5:
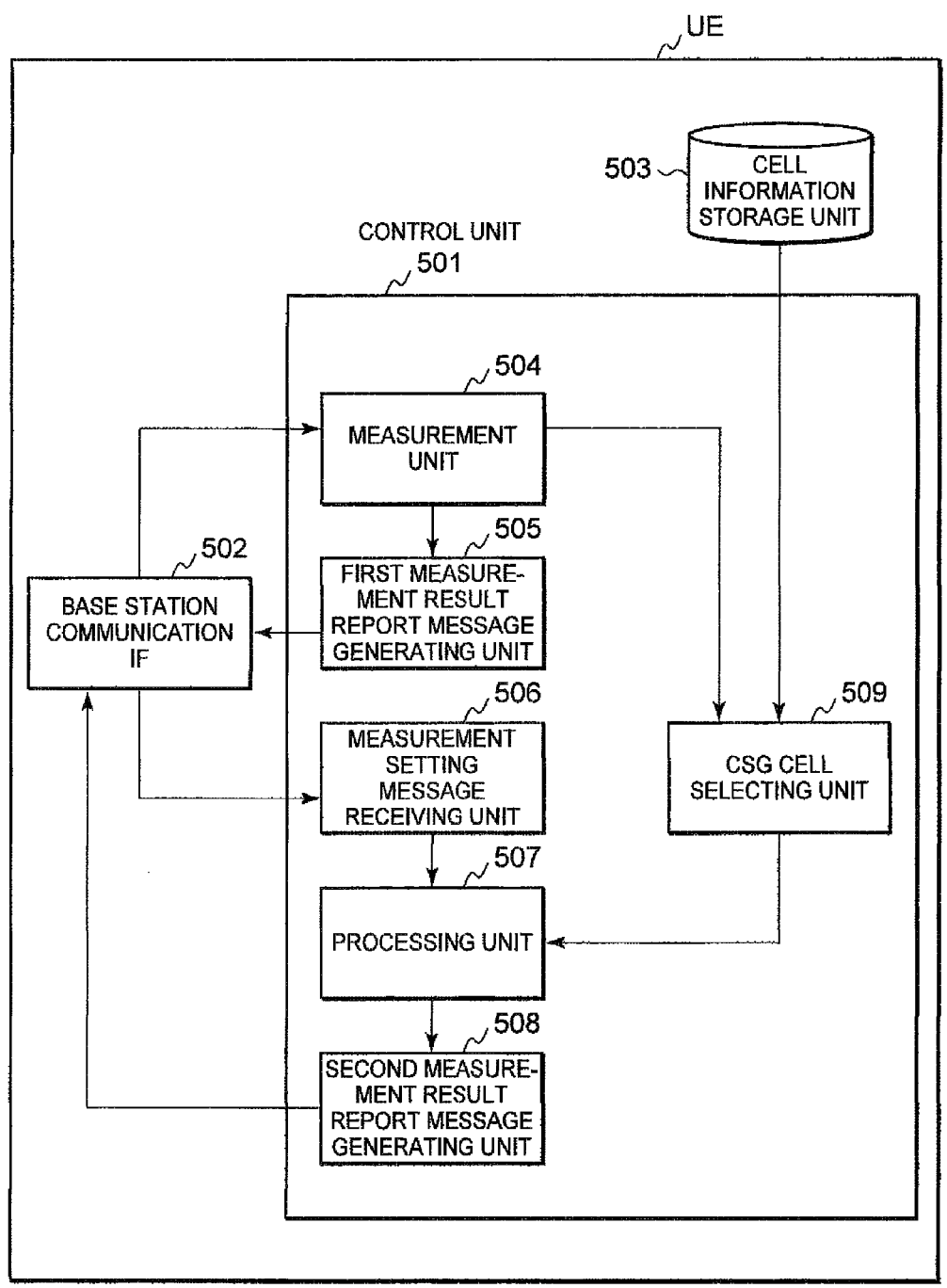
FIG. 5 is a configuration diagram of an example of a configuration of a UE according to a second embodiment of the present invention.

FIG. 5 is a diagram of an example of a configuration of the UE when notification of the threshold value $R_{th}$ is given to the UE individually using the measurement setting message, according to the second embodiment. The UE according to the second embodiment will be described with reference to FIG. 5. The UE is configured by a control unit 501, a base station communication IF 502, and a cell information storage unit 503. In addition, the control unit 501 is further configured by a measurement unit (event judging unit) 504, a first measurement result report message generating unit 505, a measurement setting message (measurement configuration) receiving unit 506, a processing unit (cell ID detecting and access permission checking unit) 507, a second measurement result report message generating unit 508, and a CSG cell selecting unit 509.

The measuring unit 504 measures the reception quality for signals from near-by cells. The first measurement result report message generating unit 505 generates the first measurement result report message including the PCI of cells with good signal reception quality, based on the measured information. The measurement setting message receiving unit 506 receives the measurement setting message including the threshold value $R_{th}$ in the setting information required for CGI detection from the serving cell. The processing unit 507 targets cells based on reception quality using the threshold value $R_{th}$, and performs CGI detection and access permission check on the targeted cells, starting from the cell with high reception quality. In addition, when a CSG cell for which access permission is granted is not present after all targeted CSG cells have been checked for access permission, because reliability of the cell information is thought to be low, the processing unit 507 performs CGI detection and access permission check even on CSG cells for which the possibility of access permission being granted is low, if the threshold value $R_{th}$ for reception quality is satisfied.

The second measurement result report message generating unit 508 generates the second measurement result report message including the CGI of the CSG cell for which access permission is granted. In addition, the second measurement result message generating unit 508 generates the second measurement result report message into which information indicating that a CSG cell for which access permission is granted is not present (such as the access-not-permitted flag) is inserted, when access permission is not granted for any of the CSG cells. In other words, according to a preferred embodiment of the present invention, when access permission is not granted for any of the cells, a generating means (second measurement result report message generating unit 508) includes, in a third message (second measurement result report message), information indicating that a cell for which access permission is granted is not present. As a result of the configuration, handover to a macro-cell or a cell having a different frequency can be attempted at an early stage.

The CSG cell selecting unit 509 selects the CSG cells for which the possibility of access permission still currently being granted is high and that have high reception quality regarding near-by cells measured for first measurement result report message transmission, in a manner similar to that according to the first embodiment. The base station communication IF 502 is an interface that performs transmission and reception of messages between the UE and the serving cell. The cell information storage unit 503 stores therein information on the CSG cells for which the possibility of access permission still currently being granted is high.

As described above, according to a preferred embodiment of the present invention, a processing means (processing unit 507) detects the global identification information of cells having reception quality of a predetermined threshold value ($R_{th}$) or more, the threshold value ($R_{th}$) being included in a second message (measurement setting message) by a connection base station (serving cell), among the cells targeted based on predetermined information, and checks access permission for a cell corresponding to the detected global identification information. As a result of the configuration, detection of global identification information of cells having good reception quality can be efficiently performed.

Figure 6:
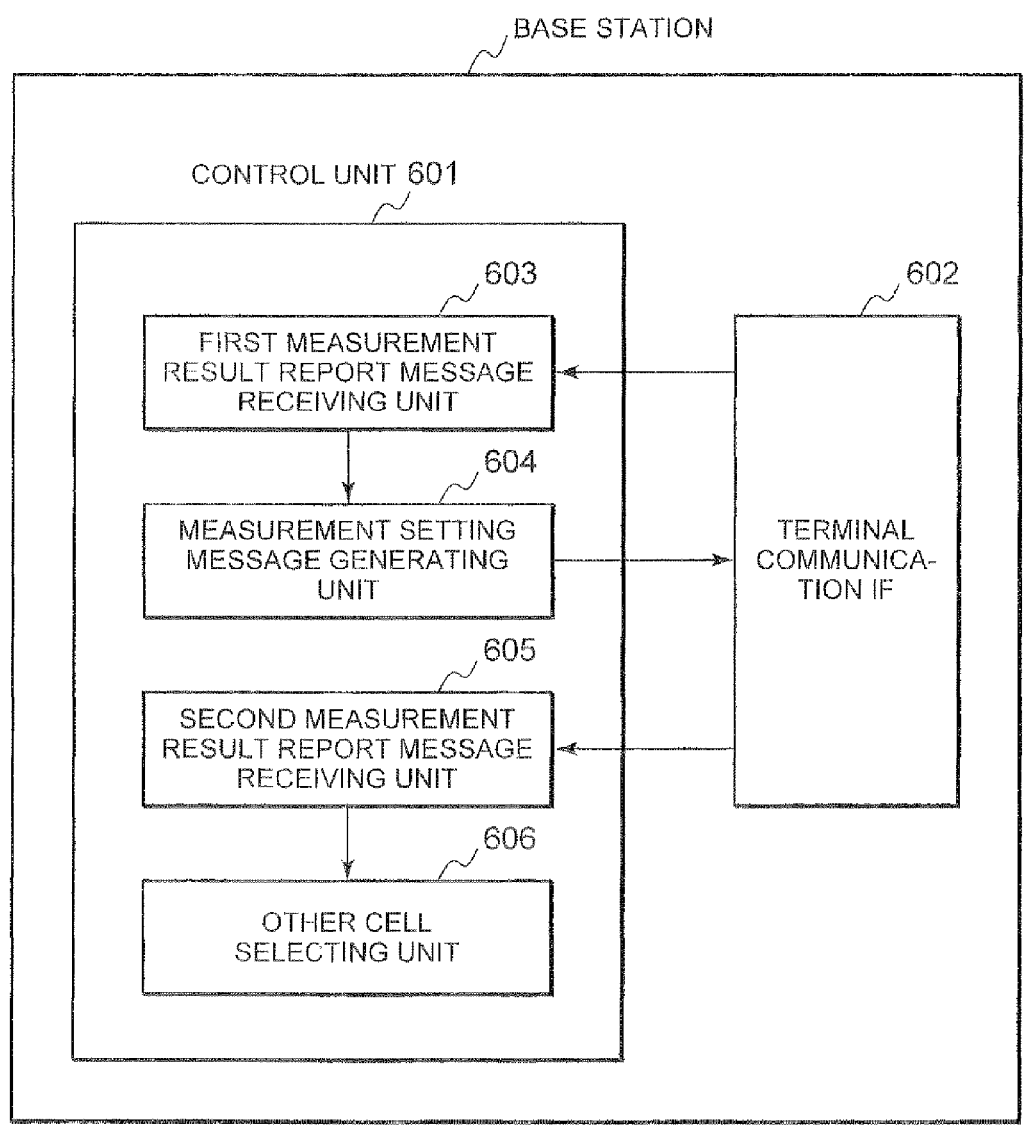
FIG. 6 is a configuration diagram of an example of a configuration of a base station (serving cell) according to the second embodiment of the present invention.

FIG. 6 is a diagram of an example of a configuration of a base station (serving cell). The base station according to the second embodiment will be described with reference to FIG. 6. The base station is configured by a control unit 601 and a terminal communication IF 602. In addition, the control unit 601 is further configured by a first measurement result report message receiving unit (CSG cell presence judging unit) 603, a measurement setting message generating unit 604, a second measurement result report message receiving unit 605, and another cell selecting unit 606. The first measurement result report message receiving unit 603 receives the first measurement result report message transmitted from the UE. The measurement setting message generating unit 604 generates the measurement setting message including the threshold value $R_{th}$ in the setting information required for CGI detection. According to a preferred embodiment of the present invention, a generating means (measurement setting message generating unit 604) includes, in a second message, a predetermined threshold value ($R_{th}$) used for cell targeting performed in the mobile terminal. As a result of the configuration, global identification information can be efficiently detected. The second measurement result report message receiving unit 605 receives the second measurement result report message. The other cell selecting unit 606 selects a macro-cell or a cell having a different frequency that is to be a next handover destination candidate, when the access-not-permitted flag is included in the second measurement result report message. The terminal communication IF 602 is an interface that performs transmission and reception of messages between the serving cell and the UE.

Figure 7:
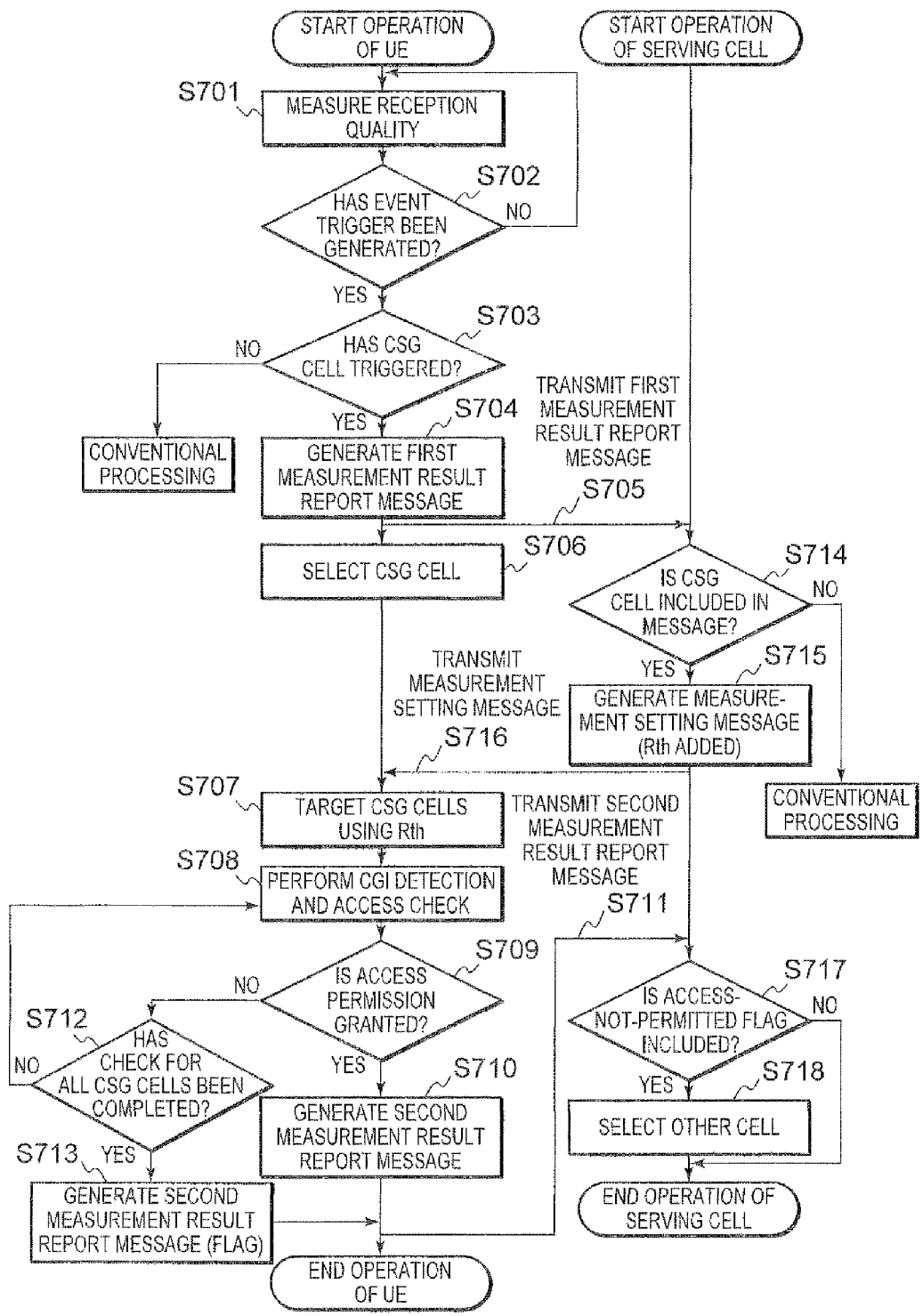
FIG. 7 is a flowchart of an example of an operation flow according to the second embodiment.

Here, an example of a processing flow according to the second embodiment of the present invention is shown in FIG. 7. The UE measures the reception quality for signals from near-by cells (Step S701), and judges whether or not an event trigger has been generated (Step S702). When judged that the event trigger has been generated, the UE judges whether or not a CSG cell has triggered (Step S703). When judged that the CSG cell has triggered, the UE generates the first measurement result report message (Step S704). Then, the UE transmits the generated first measurement result report message to the serving cell (Step S705), and subsequently selects the CSG cells (Step S706).

Then, when the UE receives the measurement setting message (measurement configuration) including the threshold value $R_{th}$ from the serving cell, the UE targets CSG cells based on reception quality using the threshold value $R_{th}$ (Step S707), and performs CGI detection and access permission check on the targeted CSG cells, starting from the CSG cell with high reception quality (Step S708). The UE judges whether or not access permission is granted (Step S709). When judged that access permission is granted, the UE generates the second measurement result report message including the CGI of the CSG cell for which access permission is granted (Step S710), and transmits the second measurement result report message to the serving cell (Step S711).

When judged at Step S709 that access permission is not granted, the UE judges whether or not access permission check for all CSG cells has been completed (Step S712). When judged that access permission check has been completed, the UE generates the second measurement result report message including, for example, the access-not-permitted flag (Step S713).

On the other hand, when the serving cell receives the first measurement result report message transmitted at Step S705, the serving cell judges whether or not a CSG cell is included in the message (Step S714). When judged that the CSG cell is included, the serving cell generates the measurement setting message including the threshold value $R_{th}$ (Step S715) and transmits the measurement setting message to the UE (Step S716). The serving cell receives the second measurement result report message transmitted at Step S711 and judges whether or not the access-not-permitted flag is included in the second measurement result report message (Step S717). When judged that the access-not-permitted flag is included, the serving cell selects a macro-cell or a cell having a different frequency that is to be the next handover destination candidate (Step S718). When judged at Step S703 that the CSG cell has not triggered or at Step S714 that the CSG cell is not included, a conventional process is performed.

Third Embodiment

According to the first and second embodiments, when reliability of the cell information held by the UE is low, the possibility becomes high that a CSG cell for which access permission is not actually granted is processed as a CSG for which the possibility of access permission being granted is high. The point according to a third embodiment is that reliability of past cell information held by the UE is judged, and a method of targeting the CSG cells on which CGI detection and access permission check are to be performed is changed based on the reliability.

Specifically, first, when a CSG cell has performed an event trigger, or in other words, when a CSG cell is included in the first measurement result report message, reliability information regarding the cell information held by the UE is added to the first measurement result report message and notification is given to the serving cell. Here, for example, reliability of the cell information held by the UE is evaluated based on elapsed time from the oldest detection point among the CSG cells included in the cell information. Cell information of which a fixed time T has elapsed from the detection point is judged to have low reliability, and cell information of which T has not elapsed is judged to have high reliability.

Notification of T may be given from the serving cell to the UE by notification information or the measurement setting message. Alternatively, the UE may hold T in advance. In addition to reliability being judged as described above, reliability may be judged based on the frequency of changes made in the cell information by change history of the cell information being recorded. For example, reliability can be judged to be low when the frequency of change during a certain fixed period is greater than a threshold value N, and reliability can be judged to be high when the frequency of change is smaller than the threshold value N.

When reliability is high, the first and second embodiments are applied. When reliability is low, the serving cell inserts a list of PCI (PCI list) of CSG cells for which CGI detection is to be performed in the measurement setting message. The PCI list is, for example, the PCI of CSG cells having reception quality that is the threshold value $R_{th}$ or higher, among the CSG cells of which notification has been given in the first measurement result report message, listed in order from that with good reception quality. The UE performs CGI detection and access permission check starting from the CSG with good reception quality by referencing the PCI list and, when access permission is confirmed for a CSG cell of which the CGI has been detected, notifies the serving cell of the CGI of the CSG cell for which access permission is granted by the second measurement result report message.

As described above, according to a preferred embodiment of the present invention, a generating means (first measurement result report message generating unit 805) includes reliability information indicating the reliability of the cell information of cells for which access permission had been granted in the past, held by the mobile terminal, in a first message (first measurement result report message). A receiving means (measurement setting message receiving unit 806) receives a second message including a cell list of cells of which the global identification information is to be detected, transmitted by the connection base station based on the reliability information. A processing means (processing unit 807) detects the global identification information based on the cell list, and checks access permission for a cell corresponding to the detected global identification information. As a result of the configuration, detection of the global identification information limited to a certain cell can be performed.

Figure 8:
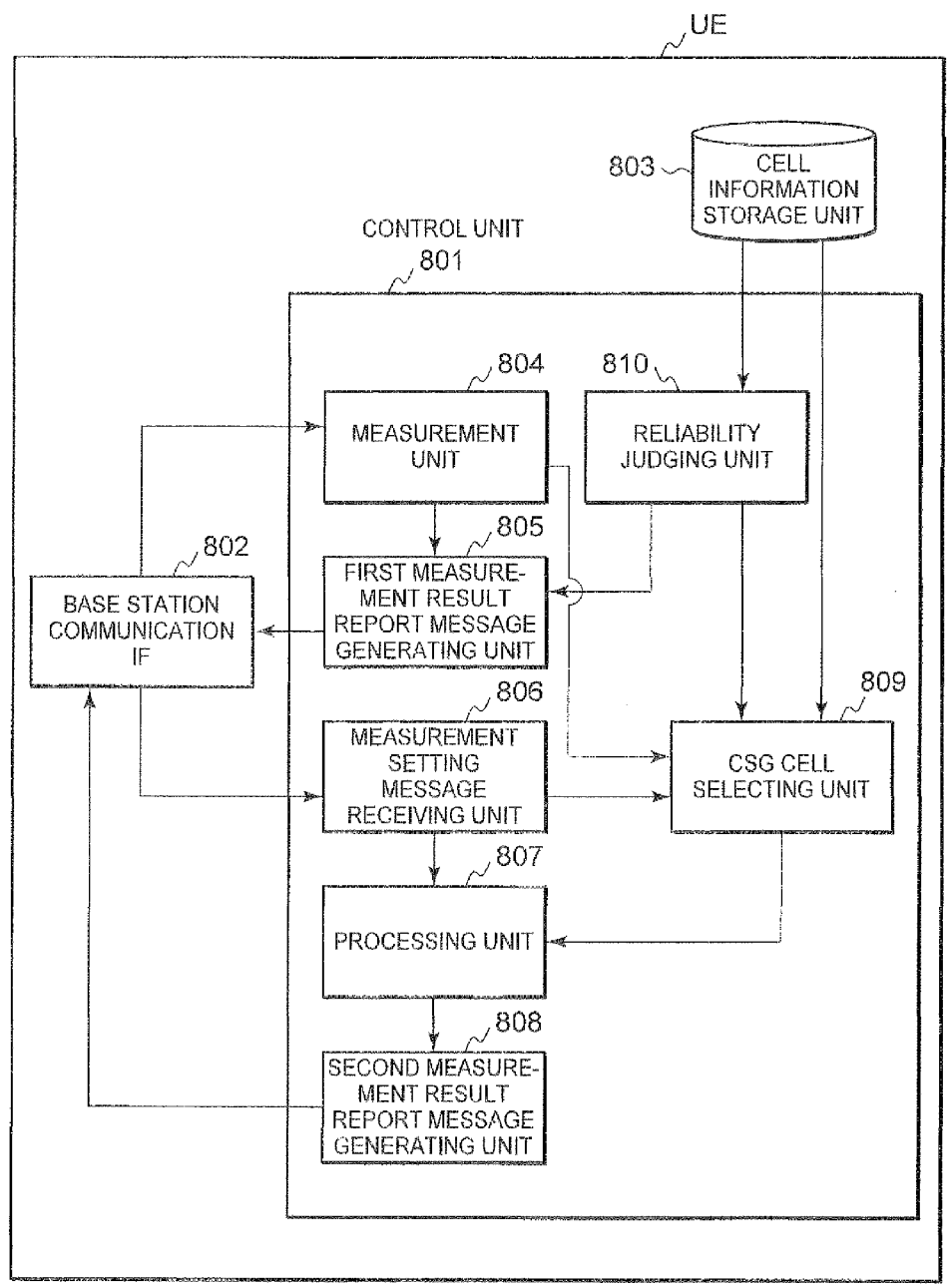
FIG. 8 is a configuration diagram of an example of a configuration of a UE according to a third embodiment of the present invention.

As a result of the third embodiment, the UE can be prevented from performing CGI detection and access permission check using cell information with low reliability. FIG. 8 is a diagram of an example of a configuration of the UE according to the third embodiment. The UE according to the third embodiment will be described with reference to FIG. 8. The UE is configured by a control unit 801, a base station communication IF 802, and a cell information storage unit 803. In addition, the control unit 801 is further configured by a measurement unit (event determining unit) 804, a first measurement result report message generating unit 805, a measurement setting message (measurement configuration) receiving unit 806, a processing unit (cell ID detecting and access permission checking unit) 807, a second measurement result report message generating unit 808, a CSG cell selecting unit 809, and a reliability judging unit 810.

The measurement unit 804 measures the reception quality for signals from near-by cells. The first measurement result report message generating unit 805 generates the first measurement result report message including the PCI of cells with good signal reception quality, based on the measured information, and to which the reliability information regarding the cell information held by the UE is further added. The measurement setting message receiving unit 806 receives the measurement setting message including the PCI list in the setting information required for CGI detection from the serving cell. The processing unit 807 performs CGI detection and access permission check in sequence from the CSG with good reception quality, by referencing the PCI list. In addition, when a CSG cell for which access permission is granted is not present after all targeted CSG cells have been checked for access permission, because reliability of the cell information is thought to be low, the processing unit 807 performs CGI detection and access permission check even on CSG cells for which the possibility of access permission being granted is low, if the threshold value $R_{th}$ for reception quality is satisfied.

The second measurement result report message generating unit 808 generates the second measurement result report message including the CGI of the CSG cell for which access permission is granted. In addition, the second measurement result message generating unit 808 generates the second measurement result report message into which information indicating that a CSG cell for which access permission is granted is not present (such as the access-not-permitted flag) is inserted, when access permission is not granted for any of the CSG cells.

The CSG cell selecting unit 809 selects a CSG cell. The reliability judging unit 810 judges the reliability of the cell information held by the UE. The base station communication IF 802 is an interface that performs transmission and reception of messages between the UE and the serving cell. The cell information storage unit 803 stores therein information on the CSG cells for which the possibility of access permission still currently being granted is high.

Figure 9:
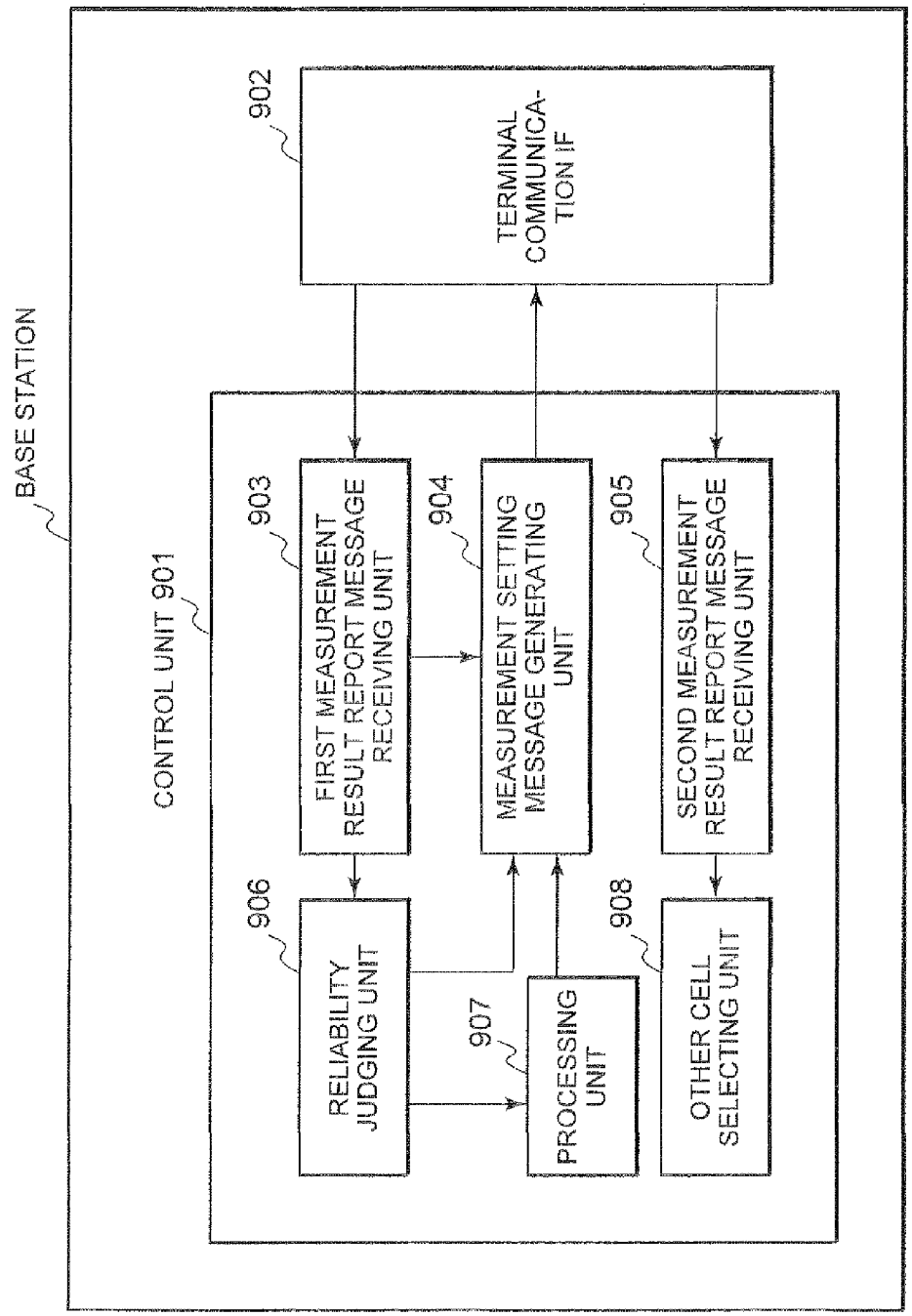
FIG. 9 is a configuration diagram of an example of a configuration of a base station (serving cell) according to the third embodiment of the present invention.

FIG. 9 is a diagram of an example of a configuration of a base station (serving cell) according to the third embodiment. The base station according to the third embodiment will be described with reference to FIG. 9. The base station is configured by a control unit 901 and a terminal communication IF 902. In addition, the control unit 901 is further configured by a first measurement result report message receiving unit (CSG cell presence judging unit) 903, a measurement setting message generating unit 904, a second measurement result report message receiving unit 905, a reliability judging unit 906, a processing unit (CSG cell selecting and PCI list generating unit) 907, and an other cell selecting unit 908.

The first measurement result report message receiving unit 903 receives the first measurement result report message transmitted from the UE. The measurement setting message generating unit 904 generates the measurement setting message including the PCI list in the setting information required for CGI detection. The second measurement result report message receiving unit 905 receives the second measurement result report message. The other cell selecting unit 908 selects a macro-cell or a cell having a different frequency that is to be a next handover destination candidate, when the access-not-permitted flag is included in the second measurement result report message. The terminal communication IF 902 is an interface that performs transmission and reception of messages between the serving cell and the UE. The reliability judging unit 906 judges the reliability of the cell information. The processing unit 907 selects the CSG cells of which the CGI is to be detected, and generates a list of the PCI of the selected CSG cells (PCI list).

As described above, a preferred embodiment of the present invention further includes a judging means (reliability judging unit 906) for judging whether or not the reliability of cell information is low, based on reliability information that is information included in a first message indicating the reliability of the cell information of cells for which access permission had been granted in the past, held by the mobile terminal. When judged that reliability is low, a generating means (measurement setting message generating unit 904) includes, in a second message, a cell list of cells of which the global identification information is to be detected. As a result of the configuration, detection of global identification information limited to a certain cell can be performed.

Figure 10:
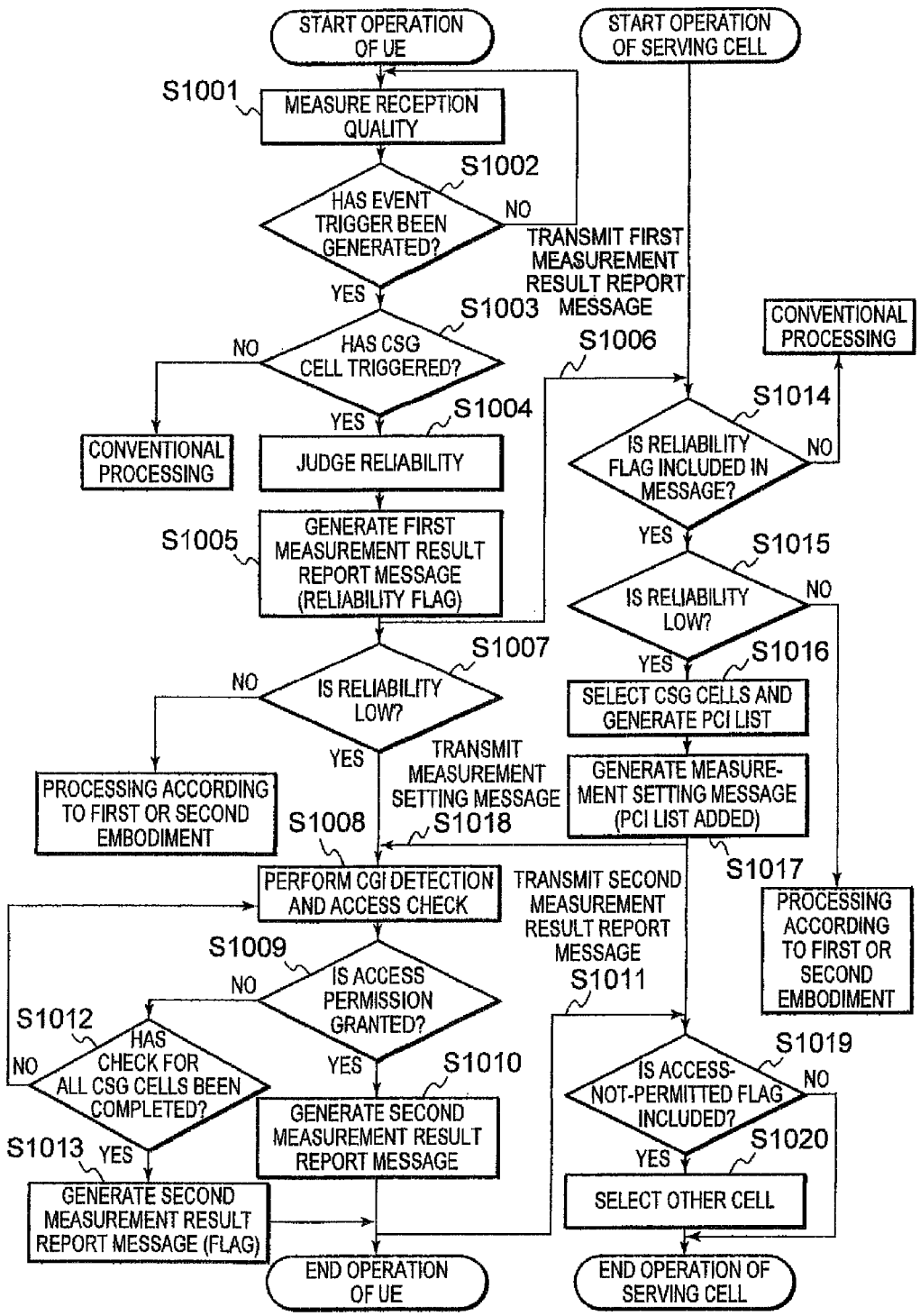
FIG. 10 is a flowchart of an example of an operation flow according to the third embodiment of the present invention.

Here, an example of a processing flow according to the third embodiment of the present invention is shown in FIG. 10. The UE measures the reception quality for signals from near-by cells (Step S1001), and judges whether or not an event trigger has been generated (Step S1002). When judged that the event trigger has been generated, the UE judges whether or not a CSG cell has triggered (Step S1003). When judged that the CSG cell has triggered, the UE judges the reliability of the cell information held by the UE (Step S1004). The UE then generates the first measurement result report message including the PCI of cells having good reception quality, and to which the reliability information regarding the cell information held by the UE has been added (Step S1005). Then, the UE transmits the generated first measurement result report message to the serving cell (Step S1006), and subsequently judges whether or not the reliability of the cell information is low (Step S1007).

Then, when judged that the reliability of the cell is low, when the UE receives the measurement setting message (measurement configuration) including the PCI list from the serving cell, the UE performs CGI detection and access permission check in sequence from the CSG with good reception quality by referencing the PCI list (Step S1008). The UE judges whether or not access permission is granted (Step S1009). When judged that access permission is granted, the UE generates the second measurement result report message including the CGI of the CSG cell for which access permission is granted (Step S1010), and transmits the second measurement result report message to the serving cell (Step S1011).

When judged at Step S1009 that access permission is not granted, the UE judges whether or not access permission check for all CSG cells has been completed (Step S1012). When judged that access permission check has been completed, the UE generates the second measurement result report message including, for example, the access-not-permitted flag (Step S1013).

On the other hand, when the serving cell receives the first measurement result report message transmitted at Step S1006, the serving cell judges whether or not the reliability flag is included in the message (Step S1014). When judged that the reliability flag is included, the serving cell judges whether or not the reliability of the cell is low (Step S1015). When the reliability is low, the serving cell selects the CSG cells of which the CGI is to be detected, and generates a list of the PCI (PCI list) of the selected CSG cells (Step S1016). The serving cell generates the measurement setting message including the PCI list in the setting information required for CGI detection (Step S1017) and transmits the measurement setting message to the UE (Step S1018). The serving cell receives the second measurement result report message transmitted at Step S1011 and judges whether or not the access-not-permitted flag is included in the second measurement result report message (Step S1019). When judged that the access-not-permitted flag is included, the serving cell selects a macro-cell or a cell having a different frequency that is to be the next handover destination candidate (Step S1020). When judged at Step S1003 that the CSG cell has not triggered or at Step S1014 that the reliability flag is not included, a conventional process is performed. In addition, when judged at Step S1007 and Step S1015 that the reliability is high, the process according to the first or second embodiment is performed.

Fourth Embodiment

According to the third embodiment, when reliability of the cell information held by the UE is low, the UE performs CGI detection and access permission check based on the PCI list created by the serving cell. The point according to a fourth embodiment is that the UE performs CGI detection and access permission check using cell information measured for first measurement result report message transmission. According to the fourth embodiment, unlike that according to the third embodiment, the serving cell is not required to be notified of the reliability information of the cell information by the first measurement result report message.

Specifically, the UE evaluates the reliability of the cell information, and the first or second embodiment is applied when the reliability is high. When the reliability is low, the serving cell adds a threshold value $R_{th}$ for reception quality to the measurement setting message when a CSG cell is included in the first measurement result report message. The UE targets CSG cells with reception quality exceeding the threshold value $R_{th}$, among the CSG cells measured by the UE for first measurement result report message transmission, without using the cell information held by the UE itself.

Next, the UE performs CGI detection and access permission check of the selected CSG cells in sequence from the CSG cell with good reception quality. When access permission is confirmed for a CSG cell of which the CGI has been detected, the UE notifies the serving cell of the CGI of the CSG cell for which access permission is granted by the second measurement result report message. As a result of the fourth embodiment, the UE can be prevented from performing CGI detection and access permission check using cell information with low reliability.

Figure 11:
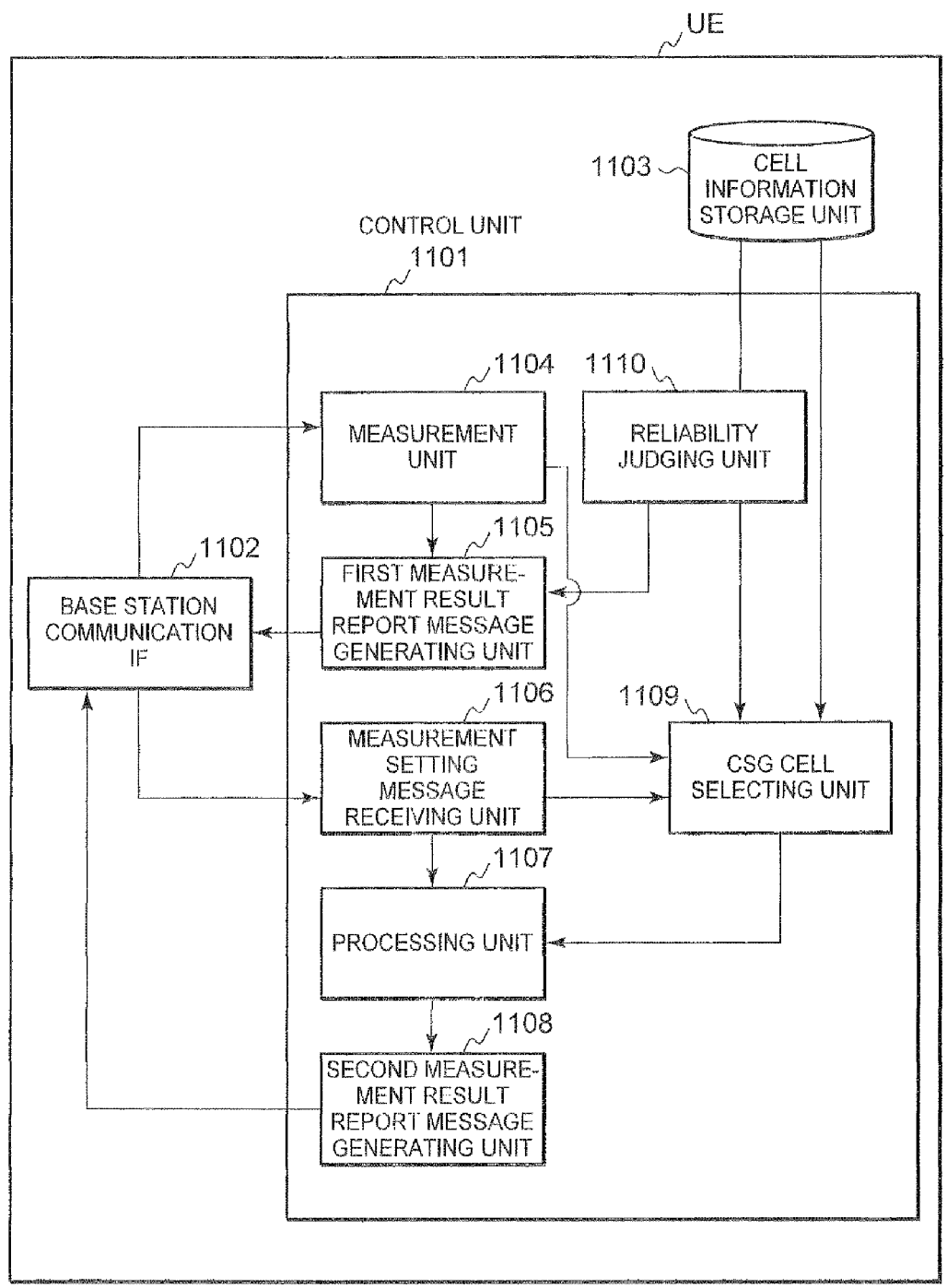
FIG. 11 is a configuration diagram of an example of a configuration of a UE according to a fourth embodiment of the present invention.

FIG. 11 is a diagram of an example of a configuration of the UE according to the fourth embodiment. The UE according to the fourth embodiment will be described with reference to FIG. 11. The configuration of the base station (serving cell) according to the fourth embodiment is similar to that according to the second embodiment, and therefore, explanation thereof is omitted. The UE is configured by a control unit 1101, a base station communication IF 1102, and a cell information storage unit 1103. In addition, the control unit 1101 is further configured by a measurement unit (event judging unit) 1104, a first measurement result report message generating unit 1105, a measurement setting message (measurement configuration) receiving unit 1106, a processing unit (cell ID detecting and access permission checking unit) 1107, a second measurement result report message generating unit 1108, a CSG cell selecting unit 1109, and a reliability judging unit 1110.

The measurement unit 1104 measures the reception quality for signals from near-by cells. The first measurement result report message generating unit 1105 generates the first measurement result report message including the PCI of cells with good signal reception quality, based on the measured information. The measurement setting message receiving unit 1106 receives the measurement setting message including the threshold value $R_{th}$ for reception quality in the setting information required for CGI detection from the serving cell. The CSG cell selecting unit 1109 targets CSG cells with reception quality exceeding the threshold value $R_{th}$, among the CSG cells measured by the UE for first measurement result report message transmission, without using the cell information held by the UE itself.

The processing unit 1107 performs CGI detection and access permission check of the selected CSG cells in sequence, from the CSG with good reception quality. In addition, when a CSG cell for which access permission is granted is not present after all targeted CSG cells have been checked for access permission, because reliability of the cell information is thought to be low, the processing unit 1107 performs CGI detection and access permission check even on CSG cells for which the possibility of access permission being granted is low, if the threshold value $R_{th}$ for reception quality is satisfied.

The second measurement result report message generating unit 1108 generates the second measurement result report message including the CGI of the CSG cell for which access permission is granted. In addition, the second measurement result message generating unit 1108 generates the second measurement result report message into which information indicating that a CSG cell for which access permission is granted is not present (such as the access-not-permitted flag) is inserted, when access permission is not granted for any of the CSG cells.

The reliability judging unit 1110 judges the reliability of the cell information held by the UE. The base station communication IF 1102 is an interface that performs transmission and reception of messages between the UE and the serving cell. The cell information storage unit 1103 stores therein information on the CSG cells for which the possibility of access permission still currently being granted is high.

As described above, according to a preferred embodiment of the present invention, a processing means (processing unit 1107) detects the global identification information of cells having reception quality of a predetermined threshold value ($R_{th}$) or more, the threshold value ($R_{th}$) being included in a second message by a connection base station (serving cell), among the cells of which the reception quality has been measured, and checks access permission for a cell corresponding to the detected global identification information. As a result of the configuration, detection of global identification information of cells having good reception quality can be efficiently performed.

Here, an example of a processing flow according to the fourth embodiment of the present invention is shown in FIG. 12. The UE measures the reception quality for signals from near-by cells (Step S1201), and judges whether or not an event trigger has been generated (Step S1202). When judged that the event trigger has been generated, the UE judges whether or not a CSG cell has triggered (Step S1203). When judged that the CSG cell has triggered, the UE judges the reliability of the cell information held by the UE (Step S1204). The UE then generates the first measurement result report message including the PCI of cells having good reception quality (Step S1205). Then, the UE transmits the generated first measurement result report message to the serving cell (Step S1206), and subsequently judges whether or not the reliability of the cell information is low (Step S1207).

Then, when judged that the reliability of the cell information is low, when the UE receives the measurement setting message (measurement configuration) including the PCI list from the serving cell, the UE targets the CSG cells with reception quality exceeding the threshold value Rth among the CSG cells measured by the UE for first measurement result report message transmission (Step S1208). The UE performs CGI detection and access permission check of the selected CSG cells in sequence, from the CSG with good reception quality (Step S1209). The UE judges whether or not access permission is granted (Step S1210). When judged that access permission is granted, the UE generates the second measurement result report message including the CGI of the CSG cell for which access permission is granted (Step S1211), and transmits the second measurement result report message to the serving cell (Step S1212).

When judged at Step S1210 that access permission is not granted, the UE judges whether or not access permission check for all CSG cells has been completed (Step S1213). When judged that access permission check has been completed, the UE generates the second measurement result report message including, for example, the access-not-permitted flag (Step S1214).

On the other hand, when the serving cell receives the first measurement result report message transmitted at Step S1206, the serving cell judges whether or not a CSG cell is included in the message (Step S1215). When judged that the CSG cell is included, the serving cell generates the measurement setting message including the threshold value $R_{th}$ in the setting information required for CGI detection (Step S1216) and transmits the measurement setting message to the UE (Step S1217). The serving cell receives the second measurement result report message transmitted at Step S1212 and judges whether or not the access-not-permitted flag is included in the second measurement result report message (Step S1218). When judged that the access-not-permitted flag is included, the serving cell selects a macro-cell or a cell having a different frequency that is to be the next handover destination candidate (Step S1219). When judged at Step S1203 that the CSG cell has not triggered or at Step S1215 that the CSG cell is not included, a conventional process is performed. In addition, when judged at Step S1207 that the reliability is high, the process according to the first or second embodiment is performed.

Fifth Embodiment

The amount of time from when the UE receives the measurement setting message from the serving cell until the UE transmits the second measurement result report message is limited. Specifically, a timer (T321) is started when the UE receives the measurement setting message, and the process for transmitting the second measurement result report message ends when the timer stops. Therefore, the UE can only perform CGI detection until the timer stops. The point according to a fifth embodiment is that the length of the timer is changed depending on the number of CSG cells on which CGI detection and access permission check are performed.

Specifically, a long timer is set when the number of CSG cells targeted by the UE or included in the PCI list of which notification has been given from the serving cell exceeds a threshold value $N_{th}$. On the other hand, when the number of CSG cells do not exceed the threshold value $N_{th}$, a short timer is set. Here, the UE can hold the threshold value $N_{th}$ and the timer values used by the UE in advance. Alternatively, notification can be given to the UE from the serving cell as notification information. Alternatively, notification can be given to the UE individually from the serving cell by the measurement setting message.

Figure 13B:
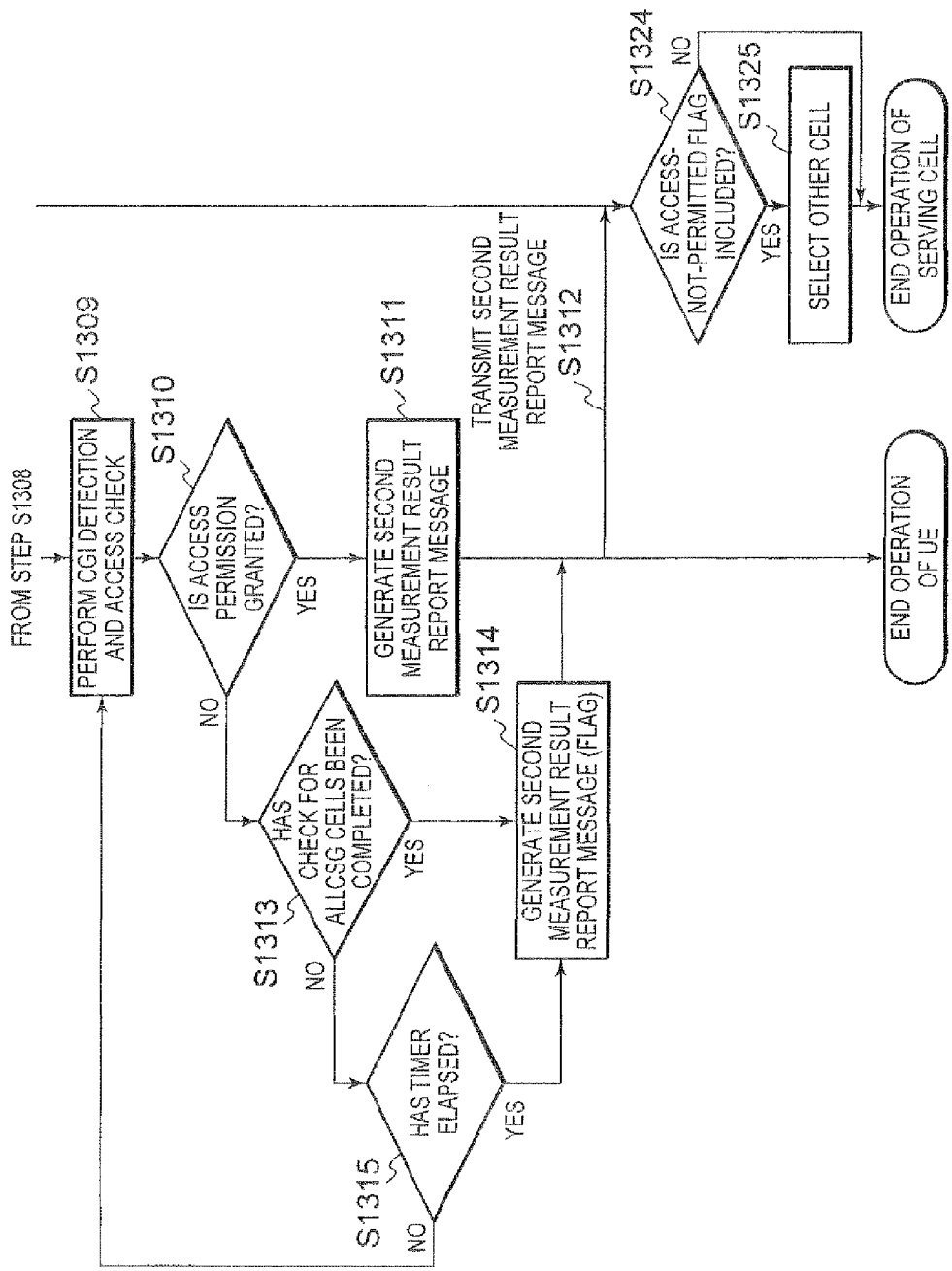
FIG. 13B is a flowchart of part of the example of the operation flow according to the fifth embodiment of the present invention.

When CGI detection and access permission check are performed based on the PCI list of which notification is given by the serving cell, in a manner similar to that according to the third embodiment, when the reliability of the cell information is low, the serving cell decides the CSG cell by the PCI list. Therefore, the serving cell can select the timer. In other words, the long timer is set when the number of CSG included in the PCI list exceeds the threshold value $N_{th}$. On the other hand, the short timer is set when the number of CSG does not exceed the threshold value $N_{th}$. In other words, according to a preferred embodiment of the present invention, the timer is set by the mobile terminal itself or the connection base station, and is set to a long amount of time when the number of selected cells exceeds a predetermined threshold ($N_{th}$) and is set to a short amount of time when the number of selected cells does not exceed the predetermined threshold. As a result of the configuration, a detection time based on the number of cells can be ensured. Notification of the timer value decided by the serving cell can be given to the UE individually using the measurement setting message. An operation flow in this instance is shown in FIG. 13A and FIG. 13B. The operation flow in this instance will be described hereafter.

When the CSG cell for which access permission is granted cannot be detected before the timer ends, a flag indicating that a CSG cell for which access permission is granted is not present is inserted and the serving cell is notified using the second measurement result report message. In other words, according to a preferred aspect of the present invention, when the second message is received and a cell for which access permission cannot be detected before a predetermined amount of time elapses in the set timer, a generating means (second measurement result report message generating unit 1408) includes, in a third message (second measurement result report message), notification that a cell for which access permission is granted is not present. As a result of the configuration, a response-wait of a long amount of time can be prevented. As a result of the fifth embodiment, the UE can be prevented from missing an opportunity to notify the serving cell of a CSG cell for which the possibility of access permission being granted is high.

Figure 14:
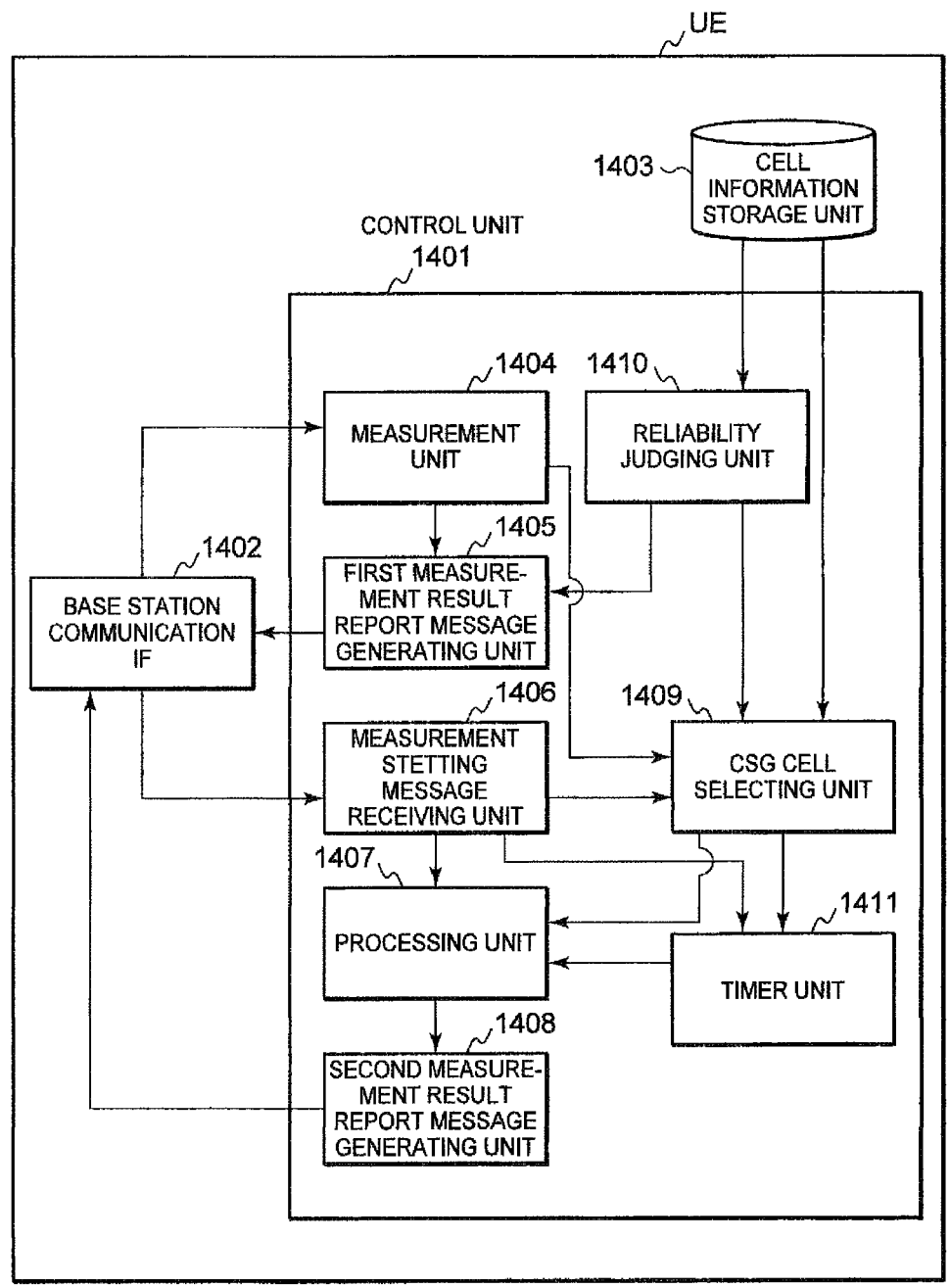
FIG. 14 is a configuration diagram of an example of a configuration of a UE according to the fifth embodiment of the present invention.

FIG. 14 is a diagram of an example of a configuration of the UE according to the fifth embodiment. The UE according to the fifth embodiment will be described with reference to FIG. 14. The UE is configured by a control unit 1401, a base station communication IF 1402, and a cell information storage unit 1403. In addition, the control unit 1401 is further configured by a measurement unit (event judging unit) 1404, a first measurement result report message generating unit 1405, a measurement setting message (measurement configuration) receiving unit 1406, a processing unit (cell ID detecting and access permission checking unit) 1407, a second measurement result report message generating unit 1408, a CSG cell selecting unit 1409, a reliability judging unit 1410, and a timer unit (timer selecting unit) 1411.

The measurement unit 1404 measures the reception quality for signals from near-by cells. The first measurement result report message generating unit 1405 generates the first measurement result report message including the PCI of cells with good signal reception quality, based on the measured information. The measurement setting message receiving unit 1406 receives the measurement setting message including the threshold value $R_{th}$, the threshold value $N_{th}$, and the timer in the setting information required for CGI detection from the serving cell.

The processing unit 1407 targets cells based on the reception quality using the threshold value $R_{th}$, and perform CGI detection and access permission check of the targeted cells, starting from the CSG cell with high reception quality. In addition, when a CSG cell for which access permission is granted is not present after all targeted CSG cells have been checked for access permission, because reliability of the cell information is thought to be low, the processing unit 1407 performs CGI detection and access permission check even on CSG cells for which the possibility of access permission being granted is low, if the threshold value $R_{th}$ for reception quality is satisfied.

The second measurement result report message generating unit 1408 generates the second measurement result report message including the CGI of the CSG cell for which access permission is granted. In addition, the second measurement result message generating unit 1408 generates the second measurement result report message into which information indicating that a CSG cell for which access permission is granted is not present (such as the access-not-permitted flag) is inserted, when access permission is not granted for any of the CSG cells.

The CSG cell selecting unit 1409 selects a CSG cell. The reliability judging unit 1410 judges the reliability of the cell information held by the UE. The timer unit 1411 sets a long timer when the number of CSG cells targeted by the UE or the number of CSG cells included in the PCI list of which notification has been given from the serving cell exceeds the threshold value $N_{th}$. On the other hand, the timer unit 1411 sets a short timer when the number of CSG cells does not exceed the threshold value $N_{th}$. The base station communication IF 1402 is an interface that performs transmission and reception of messages between the UE and the serving cell. The cell information storage unit 1403 stores therein information on the CSG cells for which the possibility of access permission still currently being granted is high.

Figure 15:
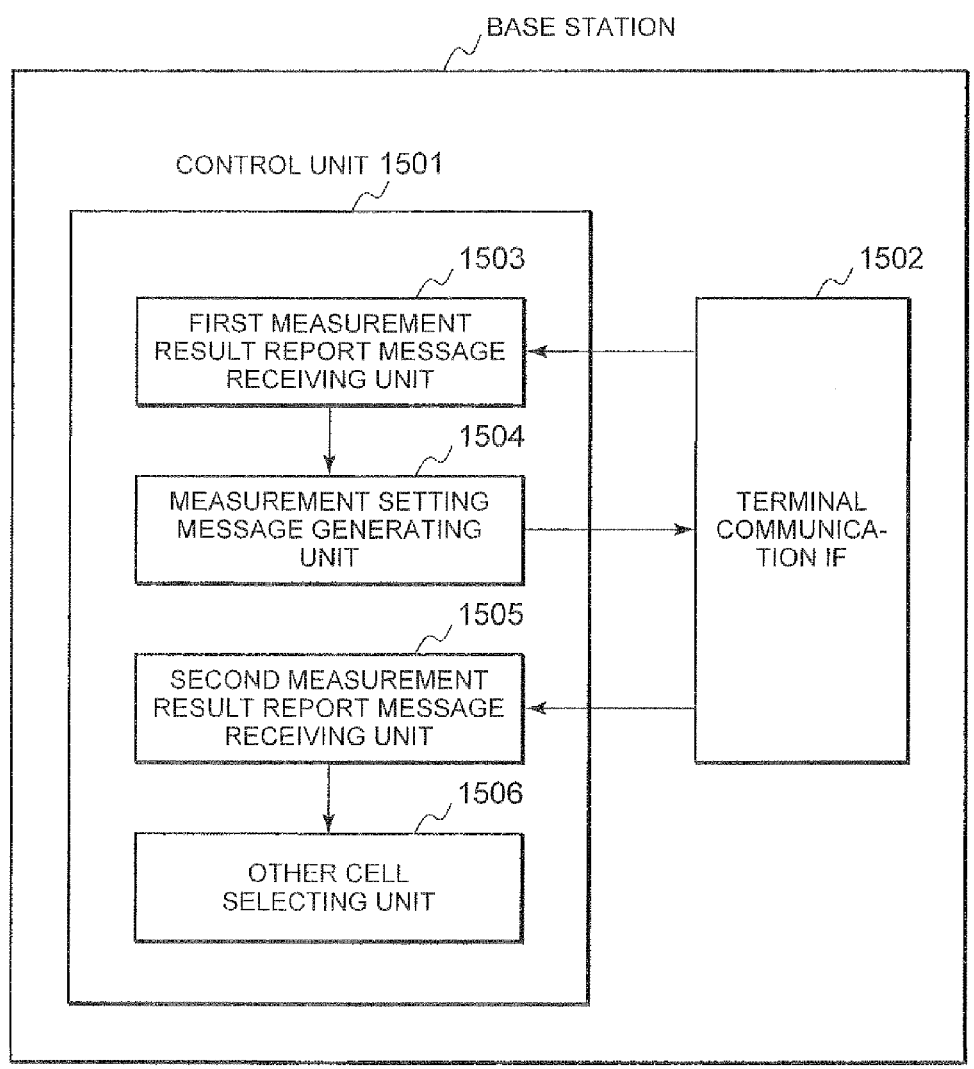
FIG. 15 is a configuration diagram of an example of a configuration of a base station (serving cell) according to the fifth embodiment of the present invention.

FIG. 15 is a diagram of an example of a configuration of the base station (serving cell) according to the fifth embodiment. The base station according to the fifth embodiment will be described with reference to FIG. 15. The base station is configured by a control unit 1501 and a terminal communication IF 1502. In addition, the control unit 1501 is further configured by a first measurement result report message receiving unit (CSG cell presence judging unit) 1503, a measurement setting message generating unit 1504, a second measurement result report message receiving unit 1505, and an other cell selecting unit 1506.

The first measurement result report message receiving unit 1503 receives the first measurement result report message transmitted from the UE. The measurement setting message generating unit 1504 generates the measurement setting message including the threshold value $R_{th}$, the threshold value $N_{th}$, and the timer in the setting information required for CGI detection. As described above, according to a preferred embodiment of the present invention, a generating means (measurement setting message generating unit 1504) generates a second message including timer values and a predetermined threshold value (Nth) for the number of cells required to judge the timer value to be selected, to set the timer indicating the amount of time over which the mobile terminal can detect the cell for which access permission is granted. As a result of the configuration, detection period can be set depending on the number of cells. The second measurement result report message receiving unit 1505 receives the second measurement result report message. The other cell selecting unit 1506 selects a macro-cell or a cell having a different frequency that is to be a next handover destination candidate, when the access-not-permitted flag is included in the second measurement result report message. The terminal communication IF 1502 is an interface that performs transmission and reception of messages between the serving cell and the UE.

Figure 16B:
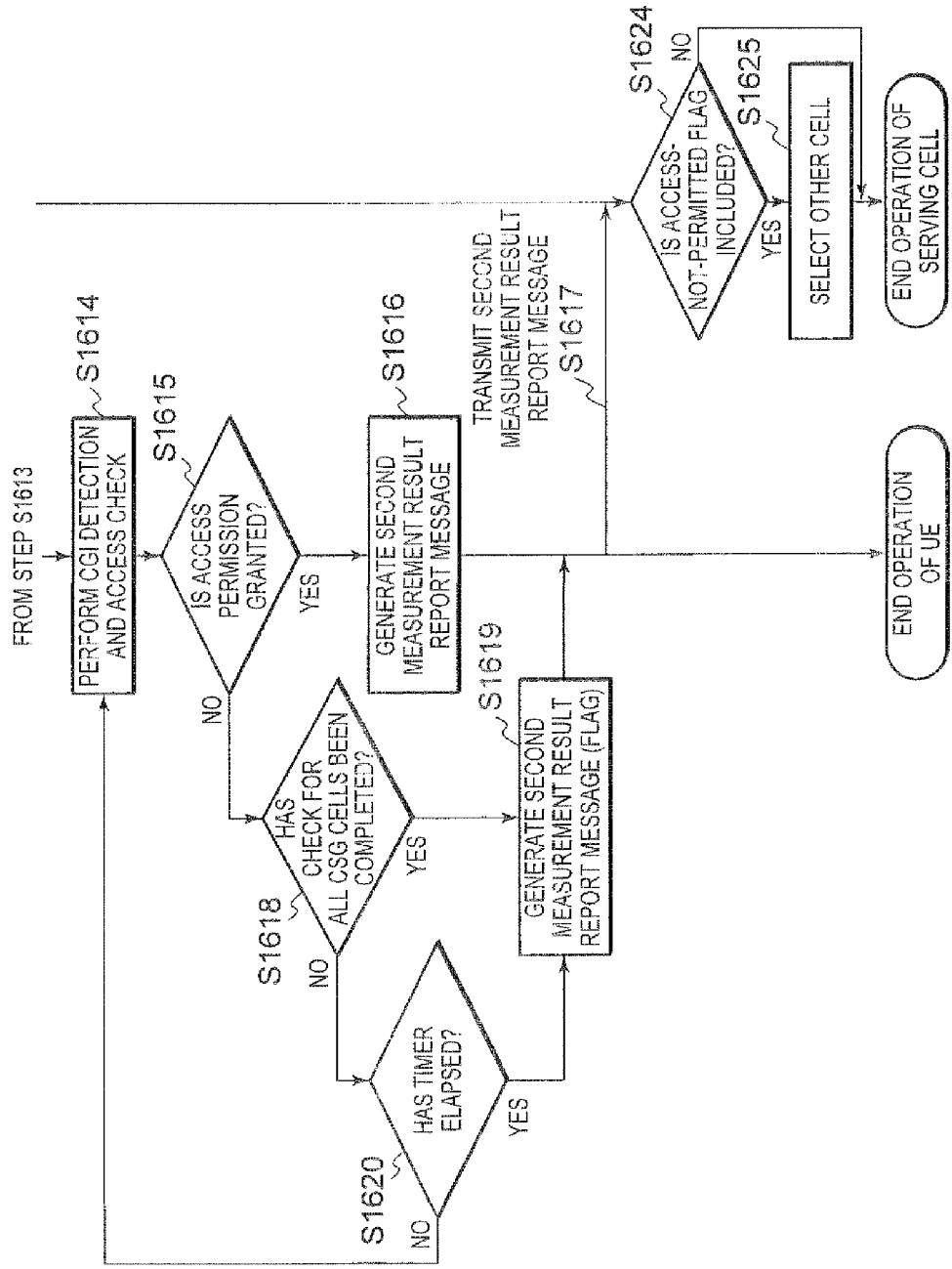
FIG. 16B is a flowchart of a part of the example of the other operation flow according to the fifth embodiment of the present invention.
Figure 17:
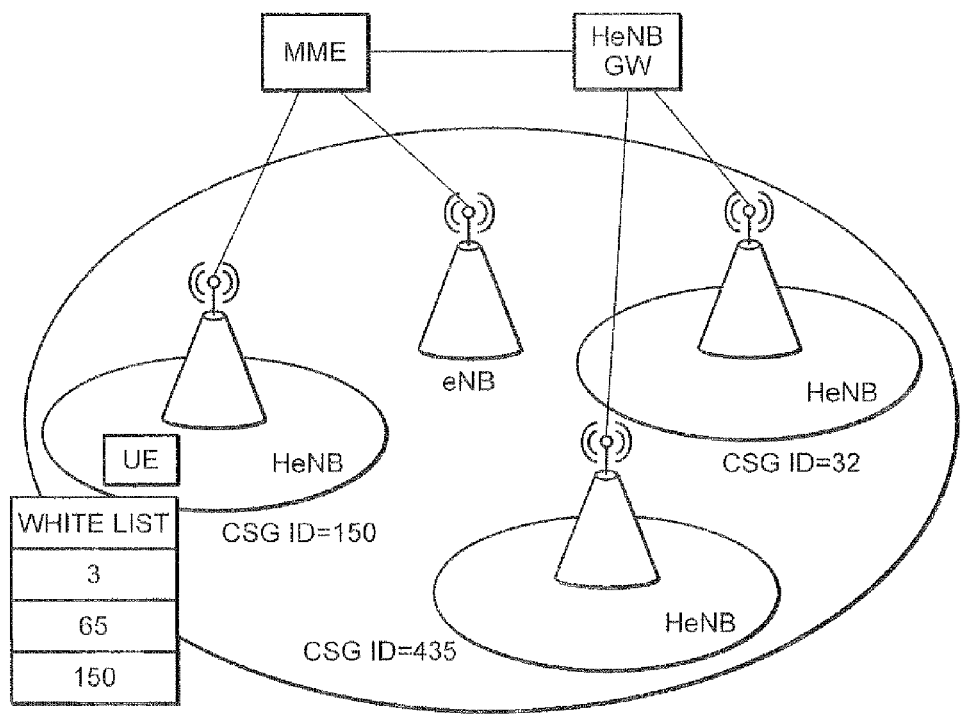
FIG. 17 is a configuration diagram of an example of a configuration of a conventional CSG cell system.
Figure 18:
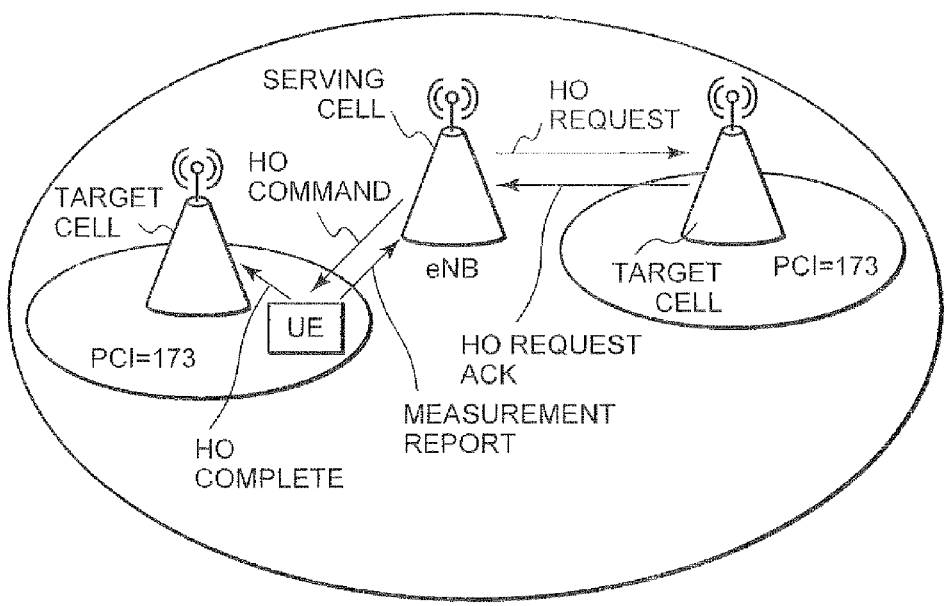
FIG. 18 is a diagram for explaining a conventional PCI confusion.
Figure 19:
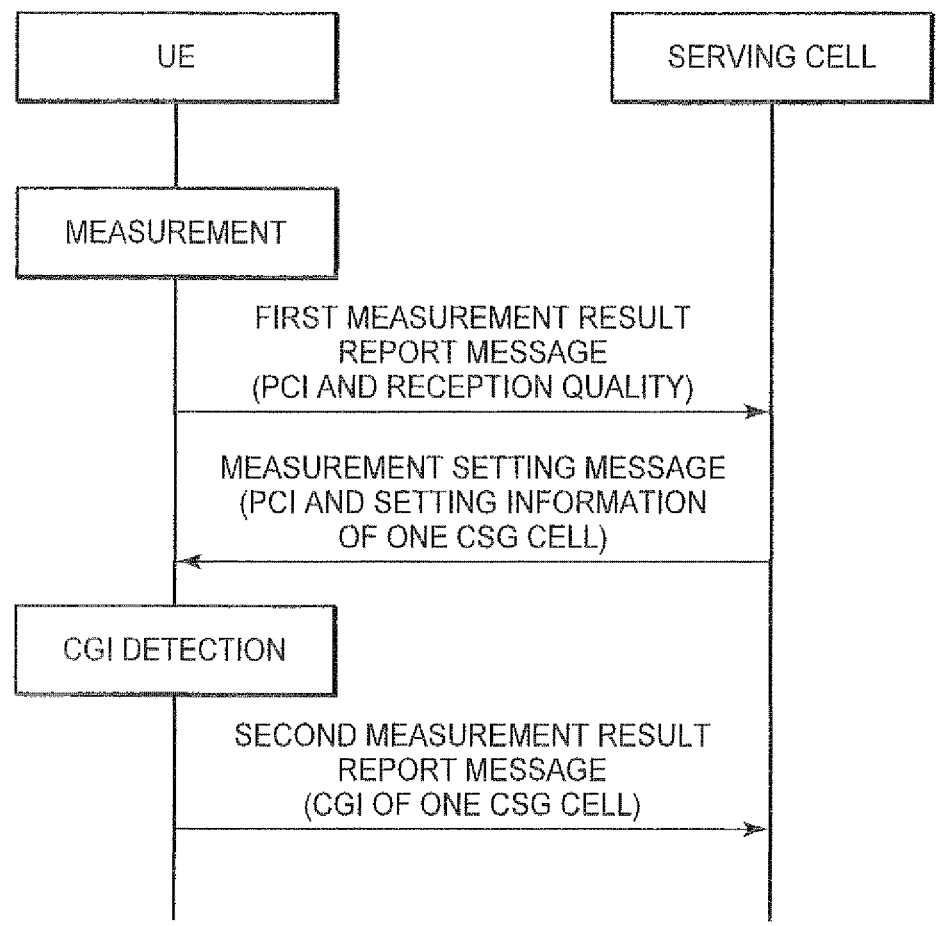
FIG. 19 is a sequence chart of an example of a conventional processing sequence of a measurement result report message.

Here, an example of a processing flow according to the fifth embodiment of the present invention is shown in FIG. 16A and FIG. 16B. The UE measures the reception quality for signals from near-by cells (Step S1601), and judges whether or not an event trigger has been generated (Step S1602). When judged that the event trigger has been generated, the UE judges whether or not a CSG cell has triggered (Step S1603). When judged that the CSG cell has triggered, the UE judges the reliability of the cell information held by the UE (Step S1604).

The UE then generates the first measurement result report message including the PCI of cells having good reception quality (Step S1605). Then, the UE transmits the generated first measurement result report message to the serving cell (Step S1606), and subsequently judges whether or not the reliability of the cell information is high (Step S1607). When judged that the reliability of the cell information is high, the UE selects the CSG cell (Step S1608).

Then, when the UE receives the measurement setting message (message configuration) including the threshold value $R_{th}$, the threshold value $N_{th}$, and the timer from the serving cell, the UE targets the CSG cells based on the reception quality using the threshold value $R_{th}$ (Step S1609). The UE judges whether the number of targeted cells is greater than the threshold value $R_{th}$ (Step S1610). When the number of targeted cells is greater than the threshold value $R_{th}$, the UE sets the long timer (Step S1611), and when the number of targeted cells is less than the threshold value $R_{th}$, the UE sets the short timer (Step S1612). Then, the UE starts the timer (Step S1613).

The UE performs CGI detection and access permission check on the selected CSG cells in sequence, from the CSG cell having good reception quality (Step S1614). The UE judges whether or not access permission is granted (Step S1615). When judged that access permission is granted, the UE generates the second measurement result report message including the CGI of the CSG cell for which access permission is granted (Step S1616), and transmits the second measurement result report message to the serving cell (Step S1617).

When judged at Step S1615 that access permission is not granted, the UE judges whether or not access permission check for all CSG cells has been completed (Step S1618). When judged that access permission check has been completed, the UE generates the second measurement result report message including, for example, the access-not-permitted flag (Step S1619). Here, when judged that access permission check has not been completed, the UE judges whether or not the amount of time set in the timer has elapsed (Step S1620). When judged that the amount of time has elapsed, the UE proceeds to Step S1619.

On the other hand, when the serving cell receives the first measurement result report message transmitted at Step S1606, the serving cell judges whether or not the CSG cell is included in the message (Step S1621). When judged that the CSG cell is included, the serving cell generates the measurement setting message including the threshold value $R_{th}$, the threshold value $N_{th}$, and the timer in the setting information required for CGI detection (Step S1622) and transmits the measurement setting message to the UE (Step S1623). The serving cell receives the second measurement result report message transmitted at Step S1617 and judges whether or not the access-not-permitted flag is included in the second measurement result report message (Step S1624). When judged that the access-not-permitted flag is included, the serving cell selects a macro-cell or a cell having a different frequency that is to be the next handover destination candidate (Step S1625). When judged at Step S1603 that the CSG cell has not triggered or at Step S1621 that the CSG cell is not included, a conventional process is performed. In addition, when judged at Step S1607 that the reliability is low, the process according to the fourth embodiment is performed.

Next, an operation flow of when the serving cell performs the above-described timer selection according to the fifth embodiment will be described with reference to FIG. 13A and FIG. 13B. The UE measures the reception quality for signals from near-by cells (Step S1301), and judges whether or not an event trigger has been generated (Step S1302). When judged that the event trigger has been generated, the UE judges whether or not a CSG cell has triggered (Step S1303). When judged that the CSG cell has triggered, the UE judges the reliability of the cell information held by the UE (Step S1304).

The UE then generates the first measurement result report message including the PCI of cells having good reception quality and a reliability flag (Step S1305). Then, the UE transmits the generated first measurement result report message to the serving cell (Step S1306), and subsequently judges whether or not the reliability of the cell information is low (Step S1307). When the UE receives the measurement setting message, described hereafter, from the serving cell, the UE starts the timer (Step S1308).

The UE performs CU detection and access permission check on the selected CSG cells in sequence, from the CSG cell with good reception quality (Step S1309). The UE judges whether or not access permission is granted (Step S1310). When judged that access permission is granted, the UE generates the second measurement result report message including the CGI of the CSG cell for which access permission is granted (Step S1311), and transmits the message to the serving cell (Step S1312).

When judged at Step S1310 that access permission is not granted, the UE judges whether or not access permission check for all CSG cells has been completed (Step S1313). When judged that access permission check has been completed, the UE generates the second measurement result report message including, for example, the access-not-permitted flag (Step S1314). Here, when judged that access permission check has not been completed, the UE judges whether or not the amount of time set in the timer has elapsed (Step S1315). When judged that the amount of time has elapsed, the UE proceeds to Step S1314.

On the other hand, when the serving cell receives the first measurement result report message transmitted at Step S1306, the serving cell judges whether or not the reliability flag is included in the message (Step S1316). When judged that the reliability flag is included, the serving cell judges whether or not the reliability of the cell is low (Step S1317). When judged that the reliability is low, the serving cell selects the CSG cells and generates the PCI list (Step S1318). The serving cell judges whether or not the number of cells in the generated PCI list is greater than the threshold value $N_{th}$ (Step S1319). When the number of cells is greater than the threshold value $N_{th}$, the serving cell sets the long timer (Step S1320), and when the number of cells is smaller than the threshold value $N_{th}$, the serving cell sets the short timer (Step S1321).

The serving cell generates the measurement setting message including the PCI list and the timer in the setting information required for CGI detection (Step S1322), and transmits the measurement setting message to the UE (Step S1323). As described above, a preferred embodiment of the present invention is that the generating means (measurement setting message generating unit 1504) generates the second message including the timer information indicating the amount of time over which the mobile terminal can detect the cell for which access permission is granted, based on the number of cells in the cell list. As a result of the configuration, a detection time based on the number of cells can be ensured. In addition, the serving cell receives the second measurement result report message transmitted at Step S1312 and judges whether or not the access-not-permitted flag is included within the second measurement result report message (Step S1324). When the access-not-permitted flag is included, the serving cell selects a macro-cell or a cell having a different frequency that is to be the next handover destination candidate (Step S1325). When judged at Step S1303 that the CSG cell has not triggered or at Step S1316 that the reliability flag is not included, a conventional process is performed. In addition, when judged at Step S1307 and at Step S1317 that the reliability is high, the process according to the first or second embodiment is performed.

Each functional block used in the descriptions of the embodiments of the present invention, described above, can be actualized as a large scale integration (LSI) that is typically an integrated circuit. Each functional block can be individually formed into a single chip. Alternatively, some or all of the functional blocks can be included and formed into a single chip. Although referred to here as the LSI, depending on differences in integration, the integrated circuit can be referred to as the integrated circuit (IC), a system LSI, a super LSI, or an ultra LSI. The method of forming the integrated circuit is not limited to LSI and can be actualized by a dedicated circuit or a general-purpose processor. A field programmable gate array (FPGA) that can be programmed or a reconfigurable processor of which connections and settings of the circuit cells within the LSI can be reconfigured can be used after LSI manufacturing. Furthermore, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

The handover destination specification system, the mobile terminal, and the base station of the present invention are capable of reducing signaling load and shortening handover processing time, and therefore, are useful as a handover destination specification system that performs a process for specifying a handover destination of a mobile terminal, a mobile terminal, a base station, and the like.

The invention claimed is:

1. A handover destination specification system that performs a process for specifying a handover destination, the handover destination specification system comprising:
    a mobile terminal that measures a reception quality of each cell indicating an accessible range formed by a plurality of base stations capable of being connection targets of the mobile terminal, and when the measured reception quality satisfies a predetermined condition, generates a first message including identification information of the cell that satisfies the predetermined condition and information on the reception quality of the cell, and transmits the first message to a connection base station to which the mobile terminal is currently connected; and
    a connection base station that generates a second message including information for detecting unique global identification information of the cell of which the reception quality has been measured, based on the first message, and transmits the second message to the mobile terminal, wherein:
    the mobile terminal detects the global identification information of the cell of which the reception quality has been measured based on the second message, checks access permission for the detected cell, and when access permission is confirmed, generates a third message including the global identification information of the cell for which access permission is granted, and transmits the third message to the connection base station;
    the mobile terminal includes, in the first message, reliability information indicating reliability of cell information of cells for which access permission had been granted in the past, held by the mobile terminal;
    the connection base station judges whether or not reliability of the cell information is low based on the reliability information of the first message, and when judged that reliability is low, includes, in the second message, a cell list of cells of which the global identification information is to be detected; and
    the mobile terminal detects the global identification information based on the cell list, and checks access permission of the cell corresponding to the detected global identification information.

2. A mobile terminal in a handover destination specification system that performs a process for specifying a handover destination of the mobile terminal, the mobile terminal comprising:
    a measuring means for measuring reception quality of each cell indicating an accessible area formed by a plurality of base stations capable of being a connection target of the mobile terminal;
    a judging means for judging whether or not the measured reception quality satisfies a predetermined condition;
    a generating means for generating, when judged that the predetermined condition is satisfied, a first message including identification information of the cell satisfying the predetermined condition and information on the reception quality of the cell;
    a transmitting means for transmitting the generated first message to a connection base station to which the mobile terminal itself is currently connected;
    a receiving means for receiving from the connection base station, a second message including information for detecting unique global identification information of the cell of which the reception quality has been measured, based on the first message; and
    a processing means for detecting the global identification information of the cell of which reception quality has been measured, based on the received second message, and checking access permission for the detected cell, wherein:
    the generating means, when access permission is confirmed, generates a third message including the global identification information of the cell for which access permission is granted;
    the transmitting means transmits the generated third message to the connection base station;
    the generating means includes, in the first message, reliability information indicating reliability of the cell information of cells for which access permission had been granted in the past, held by the mobile terminal;
    the receiving means receives the second message including a cell list of cells for which the global identification information is to be detected, transmitted from the connection base station based on the reliability information; and
    the processing means detects the global identification information based on the cell list, and checks access permission of the cell corresponding to the detected global identification information.

3. A base station to which a mobile terminal is currently connected in a handover destination specification system that performs a process for specifying a handover destination of the mobile terminal, the base station comprising:
    a receiving means for receiving from the mobile terminal, when reception quality of each cell indicating an accessible range formed by a plurality of base stations capable of being a connection target of the mobile terminal satisfies a predetermined condition, a first message including identification information of the cell satisfying the predetermined condition and information on the reception quality of the cell;
    a generating means for generating a second message including information for detecting unique global identification information of the cell of which reception quality has been measured based on the first message, the second message being a message for the mobile terminal to check access permission to the cell for which the global identification information is detected;

a transmitting means for transmitting the generated second message to the mobile terminal; and a judging means for judging whether or not reliability of cell information is low, based on reliability information indicating reliability of cell information of cells for which access permission has been granted in the past, held by the mobile terminal, that is information held in the first message, wherein:

the generating means, when judged that reliability is low, includes in the second message, a cell list of cells for which the global identification information is to be detected.

4. The base station according to claim 3, wherein the generating means generates the second message including timer information indicating an amount of time over which the mobile terminal detects a cell for which access permission is granted, based on the number of cells in the cell list.

* * * * *